(12) United States Patent
Meardi et al.

(10) Patent No.: US 11,792,440 B2
(45) Date of Patent: Oct. 17, 2023

(54) TEMPORAL SIGNALLING FOR VIDEO CODING TECHNOLOGY

(71) Applicant: V-NOVA INTERNATIONAL LIMITED, London (GB)

(72) Inventors: Guido Meardi, London (GB); Ivan Damnjanovic, London (GB)

(73) Assignee: V-NOVA INTERNATIONAL LIMITED

( * ) Notice: Subject to any disclaimer, the term of this patent is extended or adjusted under 35 U.S.C. 154(b) by 85 days.

(21) Appl. No.: 17/439,571

(22) PCT Filed: Mar. 18, 2020

(86) PCT No.: PCT/GB2020/050692
§ 371 (c)(1),
(2) Date: Sep. 15, 2021

(87) PCT Pub. No.: WO2020/188271
PCT Pub. Date: Sep. 24, 2020

(65) Prior Publication Data
US 2022/0159311 A1     May 19, 2022

Related U.S. Application Data

(60) Provisional application No. 62/984,261, filed on Mar. 2, 2020.

(30) Foreign Application Priority Data

Mar. 20, 2019   (GB) ...................................... 1903844
Mar. 23, 2019   (GB) ...................................... 1904014
(Continued)

(51) Int. Cl.
*H04N 19/93*     (2014.01)
*H04N 19/124*     (2014.01)
(Continued)

(52) U.S. Cl.
CPC ........... *H04N 19/93* (2014.11); *H04N 19/107* (2014.11); *H04N 19/124* (2014.11);
(Continued)

(58) Field of Classification Search
CPC .... H04N 19/93; H04N 19/107; H04N 19/124; H04N 19/176; H04N 19/18;
(Continued)

(56) References Cited

U.S. PATENT DOCUMENTS

2006/0013313 A1   1/2006   Han et al.
2009/0158358 A1*   6/2009   Yu .......................... H04L 5/0078
                                                                                       725/62
(Continued)

FOREIGN PATENT DOCUMENTS

GB             2509702        7/2014
WO        2005-074293     8/2005

OTHER PUBLICATIONS

"Description of video coding technology proposal by V-Nova for Low Complexity Video Coding Enhancements", 126. MPEG Meeting; Mar. 25, 2019-Mar. 29, 2019; Geneva; (Motion PictureExpert Group or ISO/IEC JTC1/SC29/WG11), No. m47215, Mar. 24, 2019 (Mar. 24, 2019), XP030211099, Retrieved from the Internet: URL: http://phenix.int-evry.fr/mpeg/doc_end_user/documents/126_Geneva/wg11/m47215-v4-m47215-v4.zip, V-Nova—Description of proposal. pptx [retrieved on Mar. 24, 2019].
(Continued)

*Primary Examiner* — Mohammed S Rahaman
(74) *Attorney, Agent, or Firm* — WORKMAN NYDEGGER

(57) ABSTRACT

An encoder (300) configured to receive an input video (302) comprising respective frames, each frame being divided into a plurality of tiles and each tile being divided into a plurality of blocks. The encoder is configured to generate a base
(Continued)

encoded stream (310) using abase encoder (306), determine (334) a temporal mode for one or more further encoded enhancement streams (328) generated using an enhancement encoder and generate the one or more further encoded enhancement streams (328) according to the determined temporal mode. The temporal mode is either a first temporal mode that does not apply non-zero values from a temporal buffer or a second temporal mode that does apply non-zero values from the temporal buffer (332). Generating the one or more further encoded enhancement streams comprises applying a transform (348) to each of a series of blocks. The temporal mode is determined for one or more of a frame, tile or block.

18 Claims, 14 Drawing Sheets

(30) Foreign Application Priority Data

| Date | | Number |
|---|---|---|
| Mar. 29, 2019 | (GB) | 1904492 |
| Apr. 15, 2019 | (GB) | 1905325 |
| Jul. 5, 2019 | (GB) | 1909701 |
| Jul. 6, 2019 | (GB) | 1909724 |
| Jul. 11, 2019 | (GB) | 1909997 |
| Jul. 25, 2019 | (GB) | 1910674 |
| Aug. 9, 2019 | (GB) | 1911467 |
| Aug. 13, 2019 | (GB) | 1911546 |
| Oct. 2, 2019 | (GB) | 1914215 |
| Oct. 6, 2019 | (GB) | 1914414 |
| Oct. 10, 2019 | (GB) | 1914634 |
| Oct. 25, 2019 | (GB) | 1915553 |
| Nov. 5, 2019 | (GB) | 1916090 |
| Dec. 10, 2019 | (GB) | 1918099 |
| Jan. 12, 2020 | (GB) | 2000430 |
| Jan. 13, 2020 | (GB) | 2000483 |
| Jan. 15, 2020 | (GB) | 2000600 |
| Jan. 16, 2020 | (GB) | 2000668 |
| Jan. 31, 2020 | (GB) | 2001408 |

(51) Int. Cl.

| | |
|---|---|
| *H04N 19/48* | (2014.01) |
| *H04N 19/107* | (2014.01) |
| *H04N 19/176* | (2014.01) |
| *H04N 19/18* | (2014.01) |
| *H04N 19/186* | (2014.01) |
| *H04N 19/33* | (2014.01) |
| *H04N 19/42* | (2014.01) |
| *H04N 19/60* | (2014.01) |
| *H04N 19/70* | (2014.01) |
| *H04N 19/91* | (2014.01) |

(52) U.S. Cl.
CPC ........... *H04N 19/176* (2014.11); *H04N 19/18* (2014.11); *H04N 19/186* (2014.11); *H04N 19/33* (2014.11); *H04N 19/42* (2014.11); *H04N 19/48* (2014.11); *H04N 19/60* (2014.11); *H04N 19/70* (2014.11); *H04N 19/91* (2014.11)

(58) Field of Classification Search
CPC ...... H04N 19/186; H04N 19/33; H04N 19/42; H04N 19/48; H04N 19/60; H04N 19/70; H04N 19/91; H04N 19/503; H04N 19/136
See application file for complete search history.

(56) References Cited

U.S. PATENT DOCUMENTS

| | | | |
|---|---|---|---|
| 2010/0135393 A1* | 6/2010 | Ying Gao | H04N 19/59 375/240.15 |
| 2013/0322524 A1* | 12/2013 | Jang | H04N 19/167 375/240.03 |
| 2014/0219349 A1* | 8/2014 | Chien | H04N 19/433 375/240.12 |
| 2019/0387224 A1* | 12/2019 | Phillips | H04N 19/115 |

OTHER PUBLICATIONS

International Search Report and Written Opinion for PCT/GB2020/050692 dated Jun. 3, 2020.

* cited by examiner

TEMPORAL SIGNALLING FOR VIDEO CODING TECHNOLOGY

CROSS-REFERENCE TO RELATED APPLICATIONS

The present application is a 371 US Nationalization of International Patent Application No. PCT/GB2020/050692, filed Mar. 18, 2020, which claims priority to U.S. Patent Application No. 62/984,261, filed Mar. 2, 2020, and to UK Patent Application Nos: 1903844.7, filed Mar. 20, 2019, 1904014.6, filed Mar. 23, 2019, 1904492.4, filed Mar. 29, 2019, 1905325.5, filed Apr. 15, 2019, 1909701.3, filed Jul. 5, 2019, 1909724.5, filed Jul. 6, 2019, 1909997.7, filed Jul. 11, 2019, 1910674.9, filed Jul. 25, 2019, 1911467.7, filed Aug. 9, 2019, 1911546.8, filed Aug. 13, 2019, 1914215.7, filed Oct. 2, 2019, 1914414.6, filed Oct. 6, 2019, 1914634.9, filed Oct. 10, 2019, 1915553.0, filed Oct. 25, 2019, 1916090.2, filed Nov. 5, 2019, 1918099.1, filed Dec. 10, 2019, 2000430.5, filed Jan. 12, 2020, 2000483.4, filed Jan. 13, 2020, 2000600.3, filed Jan. 15, 2020, 2000668.0, filed Jan. 16, 2020, and 2001408.0, filed Jan. 31, 2020. The disclosures of the aforementioned applications are incorporated herein by reference in their entireties.

TECHNICAL FIELD

The present invention relates to methods, apparatuses, computer programs and computer-readable media for use in video coding technology.

BACKGROUND

Compression and decompression of signals is a consideration in many known systems. Many types of signal, for example video, may be compressed and encoded for transmission, for example over a data communications network. When such a signal is decoded, it may be desired to increase a level of quality of the signal and/or recover as much of the information contained in the original signal as possible.

Some known systems exploit scalable encoding techniques. Scalable encoding involves encoding a signal along with information to allow the reconstruction of the signal at one or more different levels of quality, for example depending on the capabilities of the decoder and the available bandwidth.

There are several considerations relating to the reconstruction of signals in a scalable encoding system. One such consideration is the ability of the encoder and/or the decoder to process information efficiently. The efficiency with which the encoder and/or the decoder processes information may be a factor in the performance level of the encoder and/or the decoder.

SUMMARY

Various aspects of the present invention are set out in the appended claims.

Further features and advantages will become apparent from the following description, which is made with reference to the accompanying drawings.

DETAILED DESCRIPTION

Described herein is a hybrid backward-compatible coding technology.

The examples described herein provide a flexible, adaptable, highly efficient and computationally inexpensive coding format which combines a different video coding format, a base codec, (e.g. AVC, HEVC, or any other present or future codec) with at least two enhancement levels of coded data.

The general structure of the encoding scheme uses a down-sampled source signal encoded with a base codec, adds a first level of correction data to the decoded output of the base codec to generate a corrected picture, and then adds a further level of enhancement data to an up-sampled version of the corrected picture.

Thus, the streams are considered to be a base stream and an enhancement stream. It is worth noting that typically the base stream is expected to be decodable by a hardware decoder while the enhancement stream is expected to be suitable for software processing implementation with suitable power consumption.

This structure creates a plurality of degrees of freedom that allow great flexibility and adaptability to many situations, thus making the coding format suitable for many use cases including over-the-top (OTT) transmission, live streaming, live ultra-high definition (UHD) broadcast, and so on.

Although the decoded output of the base codec is not intended for viewing, it is a fully decoded video at a lower resolution, making the output compatible with existing decoders and, where considered suitable, also usable as a lower resolution output.

The codec format uses a minimum number of simple coding tools. When combined synergistically, they can provide visual quality improvements when compared with a full resolution picture encoded with the base codec whilst at the same time generating flexibility in the way they can be used.

Figure 1:
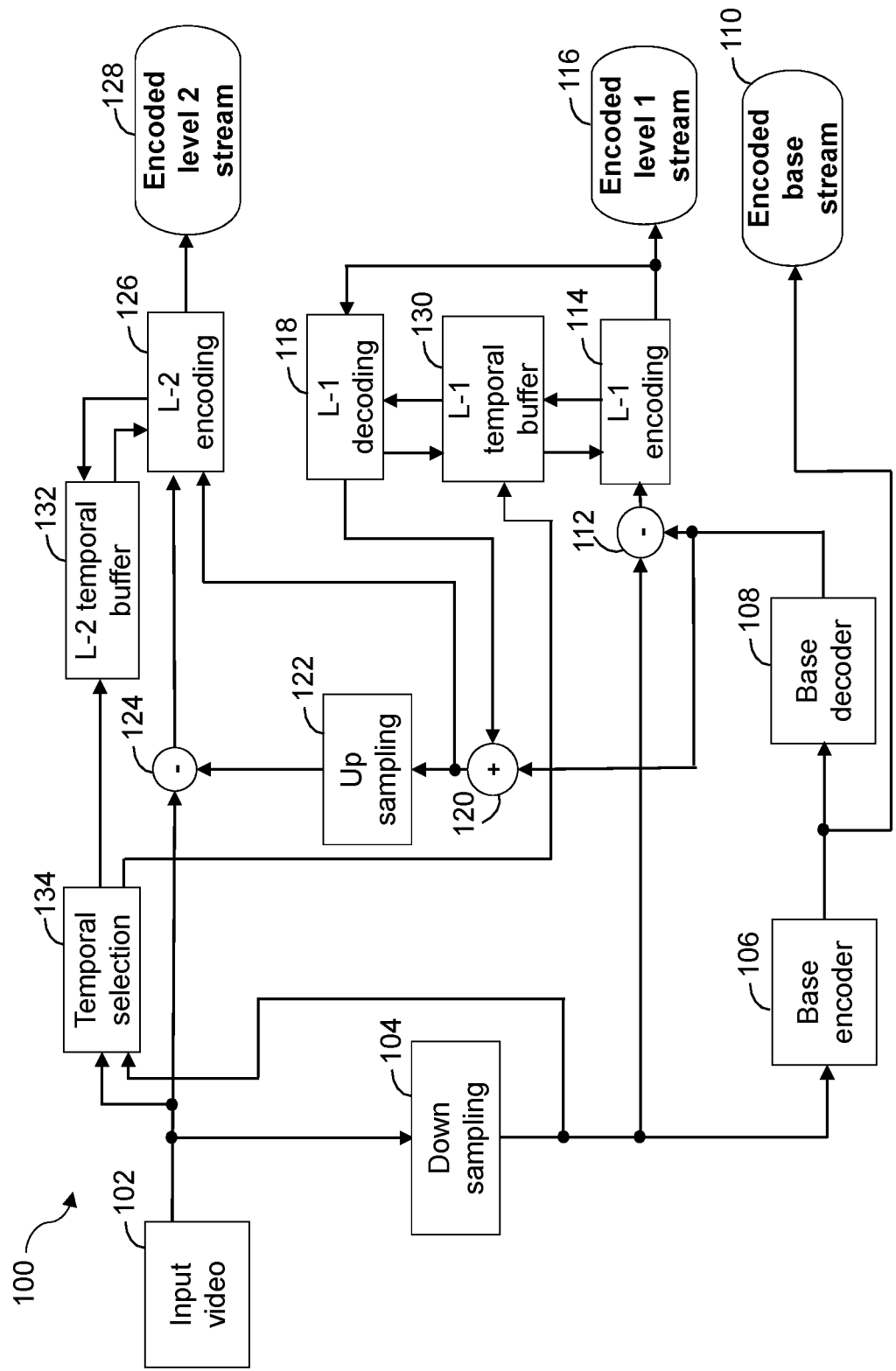
FIG. 1 is a schematic diagram illustrating an encoding process according to examples herein.

FIG. 1 shows a first example encoder 100. The illustrated components may also be implemented as steps of a corresponding encoding process.

In the encoder 100, an input full resolution video 102 is processed to generate various encoded streams. The input video 102 comprises respective frames, each frame of the respective frames being divided into a plurality of tiles and each tile of the plurality of tiles being divided into a plurality of blocks. A first encoded stream (encoded base stream 110) is produced by feeding a base encoder 106 (e.g., AVC, HEVC, or any other codec) with a down-sampled version of the input video, which is produced by down-sampling 104 the input video 102. A second encoded stream (encoded level 1 stream 116) is produced by applying an encoding operation 114 to the residuals obtained by taking the difference 112 between the reconstructed base codec video and the down-sampled version of the input video. The reconstructed base codec video is obtained by decoding the output of the base encoder 106 with a base decoder 108. A third encoded stream (encoded level 2 stream 128) is produced by processing 126 the residuals obtained by taking the difference 124 between an up-sampled version of a corrected version of the reconstructed base coded video and the input video 102. The corrected version of the reconstructed base codec video is obtained by combining 120 the reconstructed base codec video and the residuals obtained by applying a decoding operation 118 to the encoded level 1 stream 116.

The level 1 encoding operation 114 operates with an optional level 1 temporal buffer 130, which may be used to apply temporal processing as described further below. The level 2 encoding operation 126 also operates with an optional level 2 temporal buffer 132, which may be used to apply temporal processing as described further below. The level 1 temporal buffer 130 and the level 2 temporal buffer 132 may operate under the control of a temporal selection component 134. The temporal selection component 134 may receive one or more of the input video 102 and the output of the down-sampling 104 to select a temporal mode. This is explained in more detail in later examples.

Figure 2:
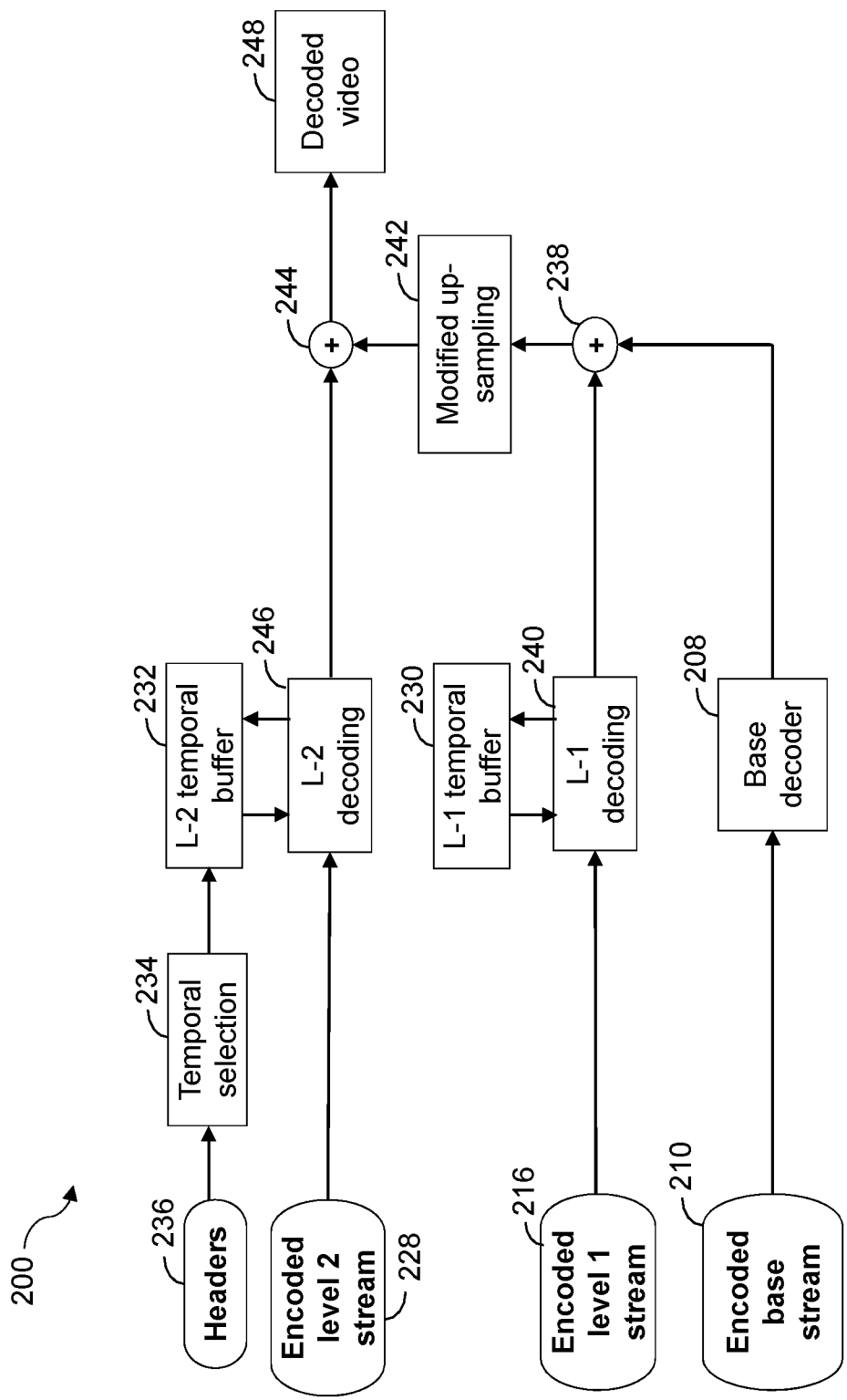
FIG. 2 is a schematic diagram illustrating a decoding process according to examples herein.

FIG. 2 shows a first example decoder 200. The illustrated components may also be implemented as steps of a corresponding decoding process. The decoder receives the three streams (an encoded base stream 210, an encoded level 1 stream 216 and an encoded level 2 stream 228) generated by an encoder such as the encoder 100 of FIG. 1 together with headers 236 containing further decoding information. The encoded base stream 210 is decoded by a base decoder 208 corresponding to the base decoder used in the encoder, and its output is combined 238 with the decoded residuals obtained by decoding 240 the encoded level 1 stream 216. The combined video is up-sampled 242 and further combined 244 with the decoded residuals obtained by applying a decoding operation 246 to the encoded level 2 stream 228.

Figure 3A:
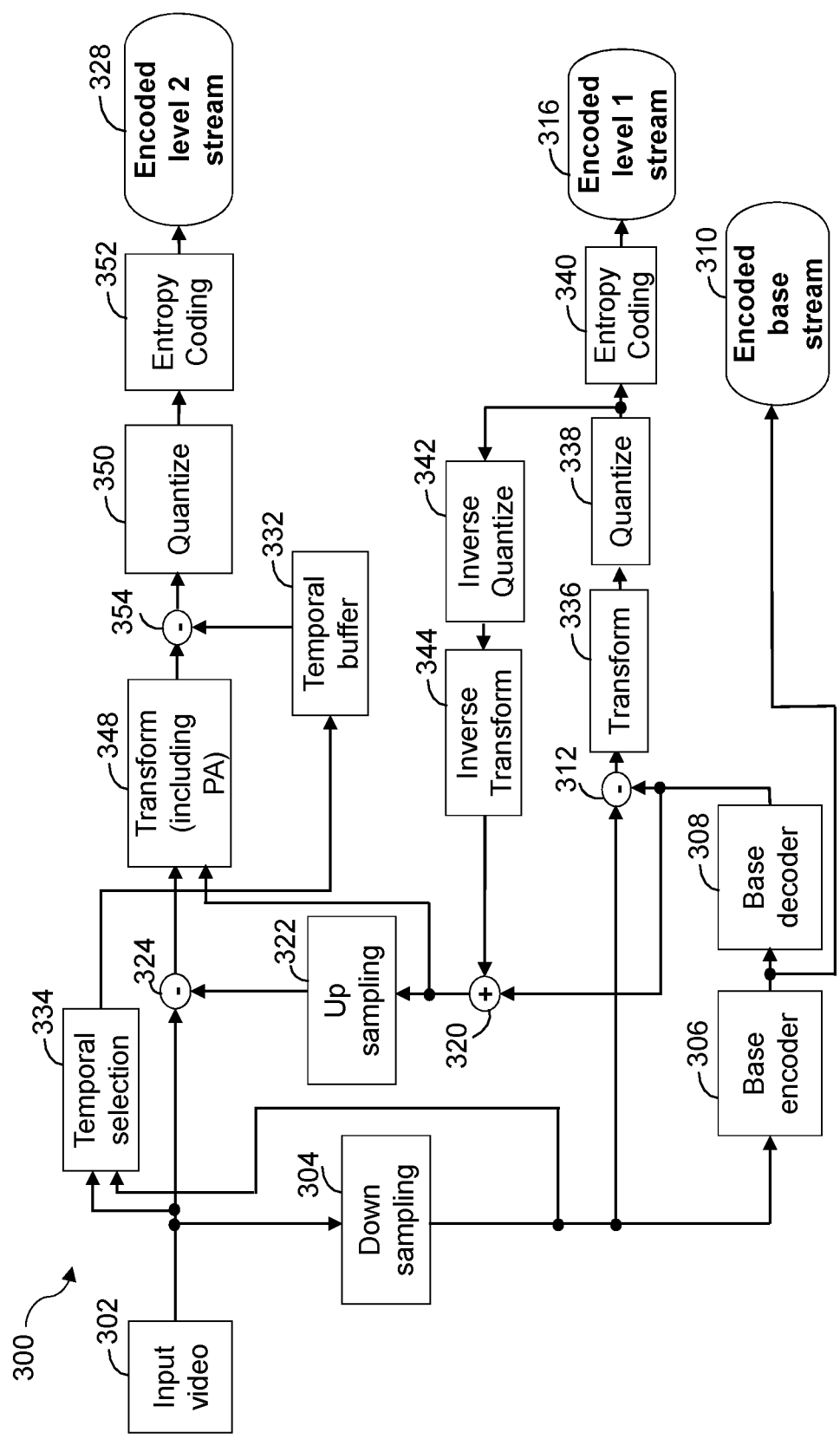
FIGS. 3A and 3B are schematic diagrams each illustrating an encoding process according to examples herein.
Figure 3B:
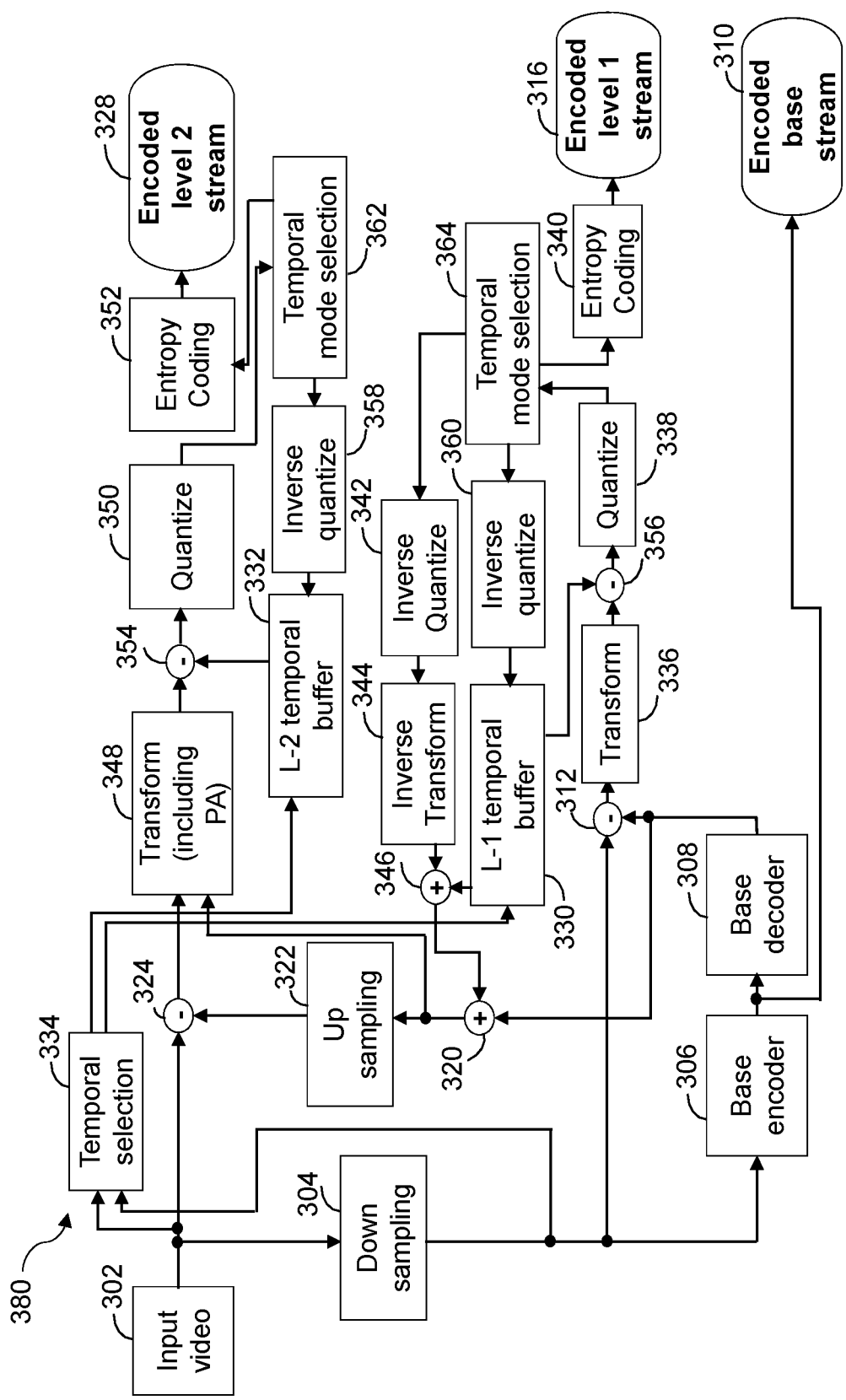

FIGS. 3A and 3B show different variations of a second example encoder 300, 380. The second example encoder 300, 380 may comprise an implementation of the first example encoder 100 of FIG. 1. In the examples of FIGS. 3A and 3B, the encoding steps of the stream are expanded in more detail to provide an example of how the steps may be performed. FIG. 3A illustrates a first variation with temporal prediction provided only in the second level of the enhancement process, i.e. with respect to the level 2 encoding. FIG. 3B illustrates a second variation with temporal prediction performed in both levels of enhancement (i.e. levels 1 and 2).

The base stream 310 is substantially created by a process as explained with reference to FIG. 1. That is, an input video 302 is down-sampled 304 (i.e. a down-sampling operation 304 is applied to the input video 302 to generate a down-sampled input video). The down-sampled video obtained by down-sampling 304 the input video 302 is then encoded using a first base encoder 306 (i.e. an encoding operation is applied to the down-sampled input video to generate an encoded base stream 310 using a first or base encoder 306). Preferably the first or base encoder 306 is a codec suitable for hardware decoding. The encoded base stream 310 may be referred to as the base layer or base level.

As noted above, the enhancement stream may comprise two streams. A first level of enhancement (described herein as "level 1") provides for a set of correction data which can be combined with a decoded version of the base stream to generate a corrected picture. This first enhancement stream is illustrated in FIGS. 1 and 3 as the encoded Level 1 stream 316. The enhancement stream may be generated by an enhancement encoder. The enhancement encoder may be different to the base encoder 306 used to generate the encoded base stream 310.

To generate the encoded Level 1 stream 316, the encoded base stream 310 is decoded using a base decoder 308 (i.e. a decoding operation is applied to the encoded base stream 310 to generate a decoded base stream). The difference 312 between the decoded base stream and the down-sampled input video obtained by down-sampling 304 the input video 302 is then created (i.e. a subtraction operation 312 is applied to the down-sampled input video and the decoded base stream to generate a first set of residuals). Here the term residuals is used in the same manner as that known in the art, that is, the error between a reference frame and a desired frame. Here the reference frame is the decoded base stream and the desired frame is the down-sampled input video. Thus the residuals used in the first enhancement level can be considered as a corrected video as they 'correct' the decoded base stream to the down-sampled input video that was used in the base encoding operation.

The difference 312 is then encoded to generate the encoded Level 1 stream 316 (i.e. an encoding operation is applied to the first set of residuals to generate a first enhancement stream 316).

In the example implementation of FIGS. 3A and 3B, the encoding operation comprises several steps, each of which is optional and preferred and provides particular benefits.

In FIG. 3, the steps include a transform step 336, a quantization step 338 and an entropy encoding step 340.

Although not shown in the Figures, in some examples, the encoding process identifies if the residuals ranking mode is selected. If residuals mode is selected the residuals ranking step may be performed (i.e. a residuals ranking operation may be performed on the first step of residuals to generate a ranked set of residuals). The ranked set of residuals may be filtered so that not all residuals are encoded into the first enhancement stream 316 (or correction stream).

The first set of residuals, or the ranked or filtered first set of residuals are then transformed 336, quantized 338 and entropy encoded 340 to produce the encoded Level 1 stream 316 (i.e. a transform operation 336 is applied to the first set of residuals or the filtered first set of residuals depending on whether or not ranking mode is selected to generate a transformed set of residuals; a quantization operation 338 is applied to the transformed set of residuals to generate a set of quantized residuals; and, an entropy encoding operation 340 is applied to the quantized set of residuals to generate the first level of enhancement stream 316). Preferably, the entropy encoding operation 340 may be a Huffman encoding operation or a run-length encoding operation or both. Optionally a control operation (not shown in the Figures) may be applied to the quantized set of residuals so as to correct for the effects of the ranking operation.

As noted above, the enhancement stream may comprise a first level of enhancement 316 and a second level of enhancement 328. The first level of enhancement 316 may be considered to be a corrected stream. The second level of enhancement 328 may be considered to be a further level of enhancement that converts the corrected stream to the original input video.

The further level of enhancement 328 is created by encoding a further set of residuals which are the difference 324 between an up-sampled version of a decoded level 1 stream and the input video 302.

In FIG. 3, the quantized (or controlled) set of residuals are inversely quantized 342 and inversely transformed 344 before a de-blocking filter (not shown in the Figures) is optionally applied to generate a decoded first set of residuals (i.e. an inverse quantization operation 342 is applied to the quantized first set of residuals to generate a de-quantized first set of residuals; an inverse transform operation 344 is applied to the de-quantized first set of residuals to generate a de-transformed first set of residuals; and, a de-blocking filter operation is optionally applied to the de-transformed first set of residuals to generate a decoded first set of residuals). The de-blocking filter step is optional depending on the transform 336 applied and comprises applying a weighted mask to each block of the de-transformed 344 first set of residuals.

The decoded base stream is combined 320 with the decoded first set of residuals (i.e. a summing operation 320 is performed on the decoded base stream and the decoded first set of residuals to generate a re-created first stream). As illustrated in FIGS. 3A and 3B, that combination is then up-sampled 322 (i.e. an up-sampling operation 322 is applied to the re-created first stream to generate an up-sampled re-created stream).

The up-sampled stream is then compared to the input video 302 which creates a further set of residuals (i.e. a difference operation 324 is applied to the up-sampled re-created stream to generate a further set of residuals). The further set of residuals are then encoded as the encoded Level 2 enhancement stream 328 (i.e. an encoding operation is then applied to the further set of residuals to generate an encoded further enhancement stream 328).

As with the encoded Level 1 stream 316, the encoding applied to the level 2 residuals may comprise several steps. FIG. 3A illustrates the steps as temporal prediction (described further below), transform 348, quantization 350 and entropy encoding 352.

Although not shown in the Figures, in some examples, the encoding process identifies if the residuals ranking mode is selected. If residuals mode is selected the residuals ranking step may be performed (i.e. a residuals ranking operation may be performed on the further set of residuals to generate a further ranked set of residuals). The further ranked set of residuals may be filtered so that not all residuals are encoded into the further enhancement stream 328.

The further set of residuals or the further ranked set of residuals are subsequently transformed 348 (i.e. a transform operation 348 is performed on the further ranked set of residuals to generate a further transformed set of residuals). As illustrated, the transform operation 348 may utilise a predicted coefficient or predicted average derived from the re-created first stream, prior to up-sampling 322. Further information is below.

FIG. 3A shows a variation of the second example encoder 300 where temporal prediction is performed as part of the level 2 encoding process. Temporal prediction is performed using the temporal selection component 334 and the level 2 temporal buffer 332. The temporal selection component 334 may determine a temporal processing mode as described in more detail below and control the use of the level 2 temporal buffer 332 accordingly. For example, if no temporal processing is to be performed the temporal selection component 334 may indicate that the contents of the level 2 temporal buffer 332 are to be set to 0. FIG. 3B shows a variation of the second example encoder 380 where temporal prediction is performed as part of both the level 1 and the level 2 encoding process. In FIG. 3B, a level 1 temporal buffer 330 is provided in addition to the level 2 temporal buffer 332. Although not shown, further variations where temporal processing is performed at level 1 but not level 2 are also possible.

When temporal prediction is selected, the second example encoder 300, 380 of FIG. 3A or 3B may further modify the coefficients (i.e. the transformed residuals output by a transform component) by subtracting a corresponding set of coefficients derived from an appropriate temporal buffer. The corresponding set of coefficients may comprise a set of coefficients for a same spatial area (e.g. a same coding unit as located within a frame) that are derived from a previous frame (e.g. coefficients for the same area for a previous frame). These coefficients may be derived or otherwise obtained from a temporal buffer. Coefficients obtained from a temporal buffer may be referred to herein as temporal coefficients. The subtraction may be applied by a subtraction component such as the third subtraction components 354 and 356 (for respective levels 2 and 1). This temporal prediction step will be further described with respect to later examples. In summary, when temporal prediction is applied, the encoded coefficients correspond to a difference between the frame and an other frame of the stream. The other frame may be an earlier or later frame (or block in the frame) in the stream. Thus, instead of encoding the residuals between the up-sampled re-created stream and the input video, the encoding process may encode the difference between a transformed frame in the stream and the transformed residuals of the frame. Thus, the entropy may be reduced. Temporal prediction may be applied selectively for groups of coding units (referred to herein as "tiles") based on control information and the application of temporal prediction at a decoder may be applied by sending additional control information along with the encoded streams (e.g. within headers or as a further surface as described with reference to later examples).

As shown in FIGS. 3A and 3B, when temporal prediction is active, each transformed coefficient may be:

$$\Delta = F_{current} - F_{buffer}$$

where the temporal buffer may store data associated with a previous frame. Temporal prediction may be performed for one colour plane or for multiple colour planes. In general, the subtraction may be applied as an element wise subtraction for a "frame" of video where the elements of the frame represent transformed coefficients, where the transform is applied with respect to a particular n by n coding unit size (e.g. 2×2 or 4×4). The difference that results from the temporal prediction (e.g. the delta above may be stored in the buffer for use for a subsequent frame. Hence, in effect, the residual that results to the temporal prediction is a coefficient residual with respect to the buffer. Although FIGS. 3A and 3B show temporal prediction being performed after the transform operation, it may also be performed after the quantize operation. This may avoid the need to apply the level 2 inverse quantization component 358 and/or the level 1 inverse quantize component 360. Thus, as illustrated in FIGS. 3A and 3B and described above, the output of the second example encoders 300, 380 after performing an encoding process is an encoded base stream 310 and one or more enhancement streams which preferably comprise an encoded level 1 stream 316 for a first level of enhancement and an encoded level 2 stream 328 for a further or second level of enhancement.

Figure 4A:
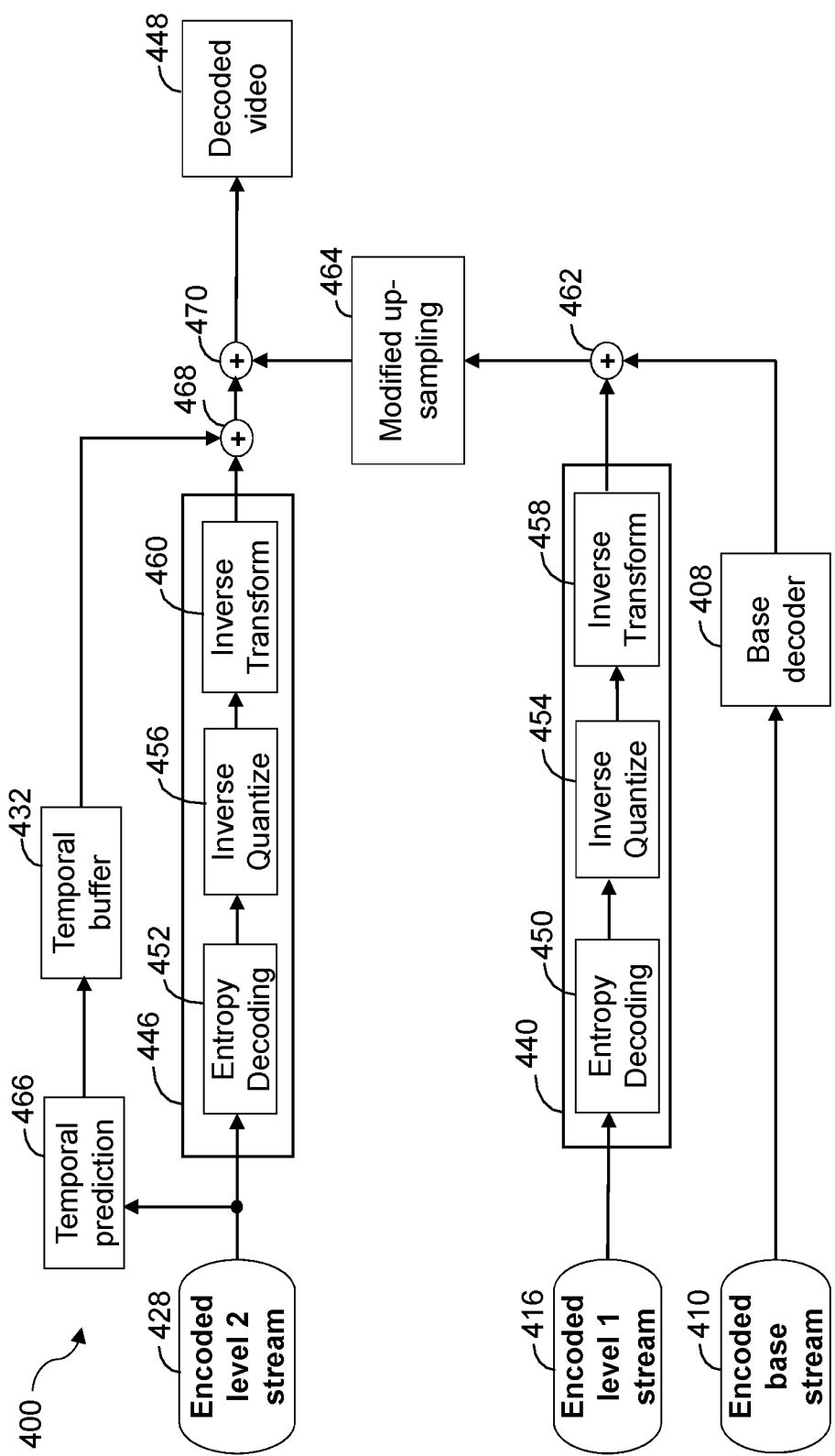
FIGS. 4A and 4B are schematic diagrams each illustrating a decoding process according to examples herein.
Figure 4B:
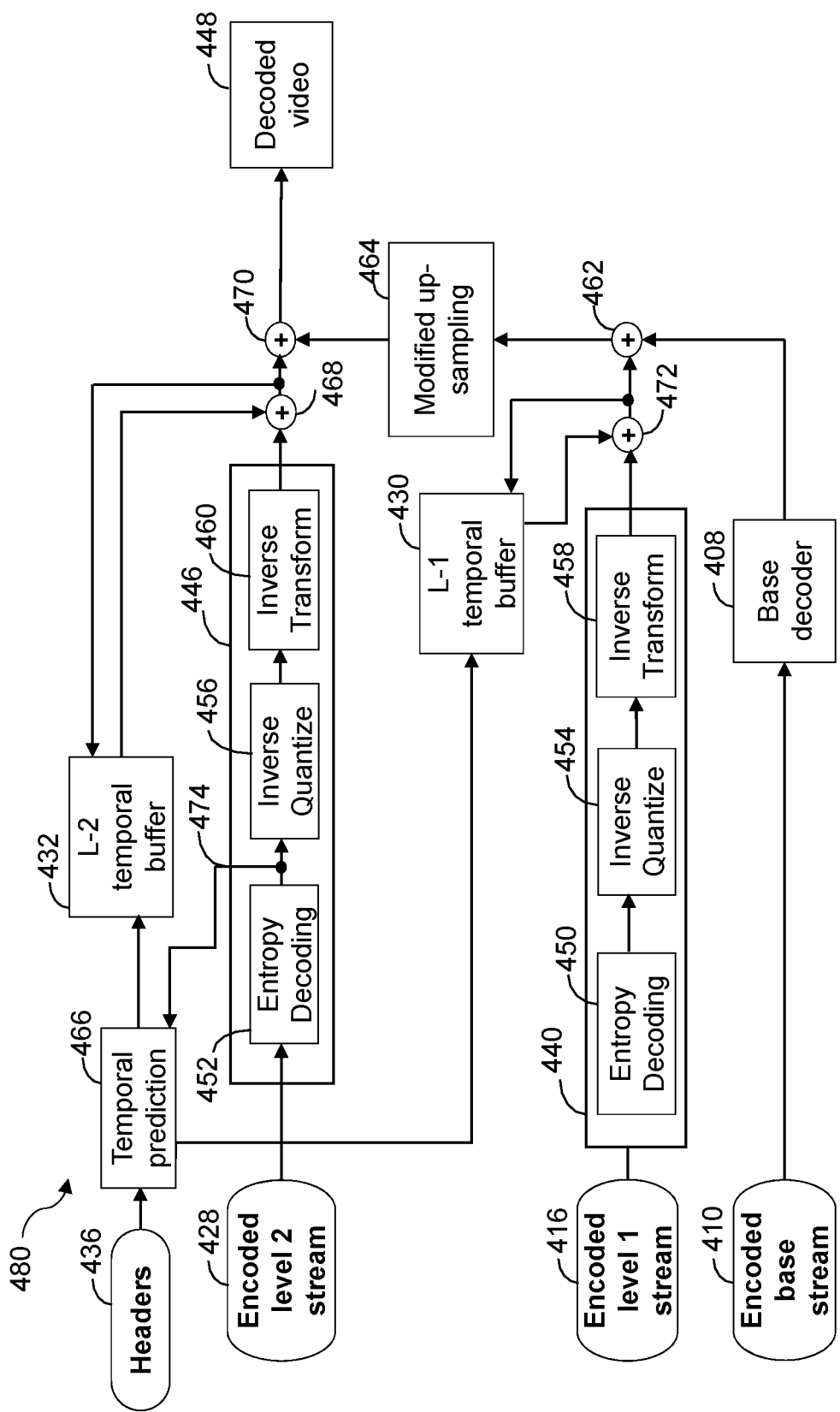

FIGS. 4A and 4B illustrate respective variations of a second example decoder 400, 480. The variations of the second example decoder 400, 480 may be respectively implemented to correspond to the first example decoder 200 of FIG. 2. As is clearly identifiable, the decoding steps and components are expanded in more detail to provide an example of how the decoding may be performed. As with FIGS. 3A and 3B, FIG. 4A illustrates a variation where temporal prediction is used only for the second level (i.e. level 2) and FIG. 4B illustrates a variation in which temporal prediction is used in both levels (i.e. levels 1 and 2). As before, further variations are envisaged (e.g. level 1 but not level 2), where the form of the configuration may be controlled using signalling information.

As shown in the example of FIG. 4B, in the decoding process, the decoder 480 may parse the headers 436 (e.g. containing global configuration data, picture configuration data, and other data blocks) and configure the decoder based on those headers 436. In order to re-create the input video, the decoder 400, 480 may decode each of the base stream 410, the first enhancement stream 416 and the further enhancement stream 428. The frames of the stream may be synchronised and then combined to derive the decoded video 448.

In each decoding process, the enhancement streams may undergo the steps of entropy decoding 450, 452, inverse quantization 454, 456 and inverse transform 458, 460 to re-create a set of residuals.

The decoding processes of FIGS. 4A and 4B comprise retrieving an array of entropy decoded quantized coefficients representing a first level of enhancement and outputting an array of L-1 residuals. The entropy decoded quantized coefficients in this case are obtained by applying the entropy decoding 450 operation to the encoded L-1 stream 416. The decoding processes of FIGS. 4A and 4B further comprise retrieving an array of samples of output of a base decoder 408. The decoding processes of FIGS. 4A and 4B further comprise applying a de-quantization process 454 to the array of entropy decoded quantized coefficients to derive a set of de-quantized coefficients, applying a transformation process 458 to the set of de-quantized coefficients and optionally applying a filter process (Not shown in FIGS. 4A and 4B) to output the array of L-1 residuals representing a first level of enhancement, which may be referred to as a preliminary set of residuals. In this case, the de-quantization process 454 is applied to entropy decoded quantized coefficients for respective blocks of a frame of the encoded level 1 stream 416, and the transformation process 458 (which may be referred to as an inverse transform operation) is applied to the output of the de-quantization process 454 for the respective blocks of the frame. The decoding processes of FIGS. 4A and 4B then further comprise recreating a picture by combining 462 the array of L-1 residuals with the array of samples of output of the base decoder 408. The decoding processes of FIGS. 4A and 4B comprise applying a transform process 458 from a set of predetermined transform processes according to a signalled parameter. For example, the transform process 458 may be applied on a 2×2 coding unit or a 4×4 coding unit. A coding unit may be referred to herein as a block of elements in an array, in this case the array of L-1 residuals.

The decoding processes of FIGS. 4A and 4B comprise retrieving an array of entropy decoded quantized coefficients representing a further level of enhancement and outputting an array of residuals. In the decoding processes shown in FIGS. 4A and 4B, the further level of enhancement is a second level of enhancement and the array of residuals output is an array of L-2 residuals. The method of FIGS. 4A and 4B further comprises retrieving the array of L-1 residuals of the first level of enhancement corresponding to the array of entropy decoded quantized coefficients representing a further level of enhancement. The method of FIGS. 4A and 4B further comprises applying an up-sampling process 464 to the array of residuals of the first level of enhancement. In FIGS. 4A and 4B, the up-sampling process 464 is applied to the combination of the array of L-1 residuals of the first level of enhancement and the corresponding array of samples of output of the base decoder 408.

In FIGS. 4A and 4B, the up-sampling process 464 is a modified up-sampling process, in which a modifier is added to a residual. The step of adding a modifier may be performed as part of the transform process 460. Alternatively, since the transform process 460 involves a linear transformation, the step of adding a modifier may be performed as part of the modified up-sampling process 464, as shown in FIGS. 4A and 4B. The step of adding a modifier therefore results in a modification of a residual. The modification may be performed based on a location of the residual in a frame. The modification may be a predetermined value.

In FIG. 4A, temporal prediction is applied during the level 2 decoding. In the example of FIG. 4A, the temporal prediction is controlled by a temporal prediction component 466. In this variation, control information for the temporal prediction is extracted from the encoded level 2 stream 428, as indicated by the arrow from the stream to the temporal prediction component 466. In other implementations, such as those shown in FIG. 4B, control information for the temporal prediction may be sent separately from the encoded level 2 stream 428, e.g. in the headers 436. The temporal prediction component 466 controls the use of the level 2 temporal buffer 432, e.g. it may determine a temporal mode and control temporal refresh as described with reference to later examples. The contents of the temporal buffer 432 may be updated based on data for a previous frame of residuals. When the temporal buffer 432 is applied, the contents of the buffer are added 468 to the second set of residuals. In FIG. 4A, the contents of the temporal buffer 432 are added 468 to the output of a level 2 decoding component 446 (which in FIG. 4A implements the entropy decoding 452, the inverse quantization 456 and the inverse transform 460). In other examples, the contents of the temporal buffer may represent any set of intermediate decoding data and as such the addition 468 may be moved appropriately to apply the contents of the temporal buffer at an appropriate stage (e.g. if the temporal buffer is applied at the dequantized coefficient stage, the addition 468 may be located before the inverse transform 460). The temporal-corrected second set of residuals are then combined 470 with the output of the up-sampling 464 to generate the decoded video 448. The decoded video 448 is at a level 2 spatial resolution, which may be higher than a level 1 spatial resolution. The second set of residuals apply a correction to the (viewable) upsampled reconstructed video, where the correction adds back in fine detail and improves the sharpness of lines and features.

The transform processes 458, 460 may be selected from a set of predetermined transform processes according to a signalled parameter. For example, the transform process 460 may be applied on a 2×2 block of elements in the array of L-2 residuals or a 4×4 block of elements in the array of L-2 residuals.

FIG. 4B shows a variation of the second example decoder 480. In this case, temporal prediction control data is received by a temporal prediction component 466 from headers 436. The temporal prediction component 466 controls both the level 1 and level 2 temporal prediction, but in other examples separate control components may be provided for both levels if desired. FIG. 4B shows how the reconstructed second set of residuals that are added 468 to the output of the level 2 decoding component 446 may be fed back to be stored in the level 2 temporal buffer 432 for a next frame (the feedback is omitted from FIG. 4A for clarity). A level 1 temporal buffer 430 is also shown that operates in a similar manner to the level 2 temporal buffer 432 described above and the feedback loop for the buffer is shown in this Figure. The contents of the level 1 temporal buffer 430 are added into the level 1 residual processing pipeline via a summation 472. Again, the position of this summation 472 may vary along the level 1 residual processing pipeline depending on where the temporal prediction is applied (e.g. if it is applied in transformed coefficient space, it may be located before the level 1 inverse transform component 458).

FIG. 4B shows two ways in which temporal control information may be signalled to the decoder. A first way is via headers 436 as described above. A second way, which may be used as an alternative or additional signalling pathway is via data encoded within the residuals themselves. FIG. 4B shows a case whereby data 474 may be encoded into an HH transformed coefficient and so may be extracted following entropy decoding 452. This data 474 may be extracted from the level 2 residual processing pipeline and passed to the temporal prediction component 466.

Each enhancement stream or both enhancement streams may be encapsulated into one or more enhancement bitstreams using a set of Network Abstraction Layer Units (NALUs). The NALUs are meant to encapsulate the enhancement bitstream in order to apply the enhancement to the correct base reconstructed frame. The NALU may for example contain a reference index to the NALU containing the base decoder reconstructed frame bitstream to which the enhancement has to be applied. In this way, the enhancement can be synchronised to the base stream and the frames of each bitstream combined to produce the decoded output video (i.e. the residuals of each frame of enhancement level are combined with the frame of the base decoded stream). A group of pictures may represent multiple NALUs.

Each frame may be composed of three different planes representing a different colour component, e.g. each component of a three-channel YUV video may have a different plane. Each plane may then have residual data that relates to a given level of enhancement, e.g. a Y plane may have a set of level 1 residual data and a set of level 2 residual data. In certain cases, e.g. for monochrome signals, there may only be one plane; in which case, the terms frame and plane may be used interchangeably. The level-1 residuals data and the level-2 residuals data may be partitioned as follows. Residuals data is divided into blocks whose size depends on the size of the transform used. The blocks are for example a 2×2 block of elements if a 2×2 directional decomposition transform is used or a 4×4 block of elements if a 4×4 directional decomposition transform is used. A tile is a group of blocks that cover a region of a frame (e.g. a M by N region, which may be a square region). A tile is for example a 32×32 tile of elements. As such, each frame in an encoded stream may be divided into a plurality of tiles, and each tile of the plurality of tiles may be divided into a plurality of blocks. For colour video, each frame may be partitioned into a plurality of planes, where each plane is divided into a plurality of tiles, and each tile of the plurality of tiles is divided into a plurality of blocks.

It was noted above how a set of processing components or tools may be applied to each of the enhancement streams (or the input video 102, 302) throughout the process. The following provides a summary each of the tools and their functionality within the overall process as illustrated in FIGS. 1 to 4.

The down-sampling process 104, 304 is applied to the input video 102, 302 to produce a down-sampled video to be encoded by a base encoder 106, 306. The down-sampling 104, 304 can be done either in both vertical and horizontal directions, or alternatively only in the horizontal direction.

The input to the L-1 encoding operation 114 comprises the L-1 residuals obtained by taking the difference 112, 312 between the decoded output of the base decoder 108, 308 and the down-sampled video obtained by down-sampling 104, 304 the input video 102, 302. The L-1 residuals are then transformed 336, quantized 338 and encoded 340 as further described below. The transform 336 outputs transform coefficients (i.e. transformed L-1 residuals).

There are two types of transforms that could be used in the transformation process 336. Both leverage small kernels which are applied directly to the residuals that remain after the stage of applying the predicted average.

A first transform has a 2×2 kernel which is applied to a 2×2 block of residuals. The resulting coefficients are as follows:

$$\begin{pmatrix}C_{00}\\C_{01}\\C_{10}\\C_{11}\end{pmatrix}=\begin{pmatrix}1 & 1 & 1 & 1\\1 & -1 & 1 & -1\\1 & 1 & -1 & -1\\1 & -1 & -1 & 1\end{pmatrix}\begin{pmatrix}R_{00}\\R_{01}\\R_{10}\\R_{11}\end{pmatrix}$$

A second transform has a 4×4 kernel which is applied to a 4×4 block of residuals. The resulting coefficients are as follows:

$$\begin{pmatrix}C_{00}\\C_{01}\\C_{02}\\C_{03}\\C_{10}\\C_{11}\\C_{12}\\C_{13}\\C_{20}\\C_{21}\\C_{22}\\C_{23}\\C_{30}\\C_{31}\\C_{32}\\C_{33}\end{pmatrix}=\begin{pmatrix}1 & 1 & 1 & 1 & 1 & 1 & 1 & 1 & 1 & 1 & 1 & 1 & 1 & 1 & 1 & 1\\1 & 1 & -1 & -1 & 1 & 1 & -1 & -1 & 1 & 1 & -1 & -1 & 1 & 1 & -1 & -1\\1 & -1 & 1 & -1 & 1 & -1 & 1 & -1 & 1 & -1 & 1 & -1 & 1 & -1 & 1 & -1\\1 & -1 & -1 & 1 & 1 & -1 & -1 & 1 & 1 & -1 & -1 & 1 & 1 & -1 & -1 & 1\\1 & 1 & 1 & 1 & 1 & 1 & 1 & 1 & -1 & -1 & -1 & -1 & -1 & -1 & -1 & -1\\1 & 1 & -1 & -1 & 1 & 1 & -1 & -1 & -1 & -1 & 1 & 1 & -1 & -1 & 1 & 1\\1 & -1 & 1 & -1 & 1 & -1 & 1 & -1 & -1 & 1 & -1 & 1 & -1 & 1 & -1 & 1\\1 & -1 & -1 & 1 & 1 & -1 & -1 & 1 & -1 & 1 & 1 & -1 & -1 & 1 & 1 & -1\\1 & 1 & 1 & 1 & -1 & -1 & -1 & -1 & 1 & 1 & 1 & 1 & -1 & -1 & -1 & -1\\1 & 1 & -1 & -1 & -1 & -1 & 1 & 1 & 1 & 1 & -1 & -1 & -1 & -1 & 1 & 1\\1 & -1 & 1 & -1 & -1 & 1 & -1 & 1 & 1 & -1 & 1 & -1 & -1 & 1 & -1 & 1\\1 & -1 & -1 & 1 & -1 & 1 & 1 & -1 & 1 & -1 & -1 & 1 & -1 & 1 & 1 & -1\\1 & 1 & 1 & 1 & -1 & -1 & -1 & -1 & -1 & -1 & -1 & -1 & 1 & 1 & 1 & 1\\1 & 1 & -1 & -1 & -1 & -1 & 1 & 1 & -1 & -1 & 1 & 1 & 1 & 1 & -1 & -1\\1 & -1 & 1 & -1 & -1 & 1 & -1 & 1 & -1 & 1 & -1 & 1 & 1 & -1 & 1 & -1\\1 & -1 & -1 & 1 & -1 & 1 & 1 & -1 & -1 & 1 & 1 & -1 & 1 & -1 & -1 & 1\end{pmatrix}$$

$$\begin{pmatrix} R_{00} \\ R_{01} \\ R_{02} \\ R_{03} \\ R_{10} \\ R_{11} \\ R_{12} \\ R_{13} \\ R_{20} \\ R_{21} \\ R_{22} \\ R_{23} \\ R_{30} \\ R_{31} \\ R_{32} \\ R_{33} \end{pmatrix}$$

Suitably adapted transformations may also be applied if down- and/or up-sampling is performed in a horizontal direction only (e.g. with certain elements set to 0). If the Hadamard transformation is used, e.g. as illustrated in the example matrices above, then a decoding or inverse transformation may use the same matrix, e.g. Hadamard matrices are their own inverse. In this case, for example, a (M×N)×1 array of residuals R relating to a M×N block may be derived at the decoder from a corresponding (M×N)×1 array of coefficients C, using R=H*C where H equals one of the Hadamard matrices shown above.

The coefficients are then quantized 338 using a linear quantizer. The linear quantizer may use a dead zone of variable size. The linear quantizer may use a dead zone of different size compared to the quantization step and non-centered dequantization offset.

The quantized coefficients are encoded using an entropy coder 340. There are two schemes of entropy coding 340. In a first scheme, the quantized coefficients are encoded using a Run-Length-Encoder (RLE). In a second scheme, the quantized coefficients are first encoded using RLE, then the encoded output is processed using a Huffman Encoder. This may beneficially encode long streams of 0s, which are typically found with transformed residuals, with the RLE, and then further beneficially encode different frequencies of quantized values (e.g. that often have a reduced number as the value increases due to the distributions of the residuals and their linearly transformed values) using the Huffman encoder.

If residual mode (RM) has been selected, the L-1 residuals are further ranked and selected in order to determine which residuals should be transformed 336 and encoded. Preferably this is preformed prior to entropy encoding 340.

If the temporal selection mode is selected for the L-1 encoding, the encoder will further modify the coefficients by subtracting the corresponding coefficients derived from a level 1 temporal buffer 130, 330, i.e. temporal prediction described below.

The input to the L-1 decoding operation 118 comprises the L-1 encoded residuals, which are passed through an entropy decoder 450, a de-quantizer 454 and an inverse transform module 458. The operations performed by these modules are the inverse operations performed by the modules described above.

If the temporal selection mode has been selected for the L-1 encoding, the residuals may be in part predicted from co-located residuals from a level 1 temporal buffer 130, 330. The co-located residuals may be referred to herein as temporal predictions.

If a 4×4 transform is used, the decoded residuals may be fed to a deblocking filter module. The deblocking filter operates on each block of transformed residuals by applying a mask whose weights can be specified. The general structure of the mask is as follows:

$$\begin{matrix} \alpha & \beta & \beta & \alpha \\ \beta & 1 & 1 & \beta \\ \beta & 1 & 1 & \beta \\ \alpha & \beta & \beta & \alpha \end{matrix}$$

where $0 \leq \alpha \leq 1$ and $0 \leq \beta \leq 1$.

The output from combining 120, 320 the decoded (and deblocked, if applicable) L-1 residuals and base decoded video is up-sampled 122, 322 in order to generate an up-sampled reconstructed video. The upsampling may be selectable and signalled in the bytestream.

The input to the L-2 encoding operation 126 comprises the L-2 residuals obtained by taking the difference 124, 324 between the up-sampled reconstructed video and the input video 102, 302. The L-2 residuals are then transformed 348, quantized 350 and encoded 352 as further described below. The transform 348, quantization 350 and encoding 352 are performed in the same manner as described in relation to L-1 encoding 114. As explained with reference to the L-1 encoding 114, the transform 348 outputs transform coefficients (i.e. transformed L-2 residuals). If RM has been selected, the L-2 residuals are further ranked and selected in order to determine which residuals should be transformed and encoded. The L-2 encoding operation 126 may further comprise two additional processes as described below.

If the predicted coefficient mode is selected, the encoder will further modify the transformed coefficient COO (e.g. an "Average" or "A" coefficient for a 2×2 transform). If the 2×2 transform is used, COO will be modified by subtracting the value of the up-sampled residual which the transformed block of residuals is predicted from. If the 4×4 transform is used, COO will be modified by subtracting the average value of the four up-sampled residuals which the transformed block of residuals is predicted from.

If the temporal selection mode is selected for the L-2 encoding, the encoder will further modify the coefficients by subtracting the corresponding coefficients derived from a level 2 temporal buffer 132, 332, as described above.

The input to the L-2 decoding operation 246, 446 comprises the encoded L-2 residuals. The decoding process of the L-2 residuals are passed through an entropy decoder 452, a de-quantizer 456 and an inverse transform module 460. The operations performed by these modules are the inverse operations performed by the modules described above. If the temporal selection mode has been selected for the L-2 encoding, the residuals may be in part predicted from co-located residuals from a level 2 temporal buffer 132, 332. The co-located residuals may be referred to herein as temporal predictions.

The modified up-sampling process 242, 464 comprises two steps, the second depending on a signalling received by the decoder. In a first step, the combination 238, 462 of the decoded (and deblocked, if applicable) L-1 residuals and base decoded video 208, 408 (L-1 reconstructed video) is up-sampled to generate an up-sampled reconstructed video. If the predicted coefficient mode has been selected, then a second step is implemented. In particular, the value of the element in the L-1 reconstructed value from which a 2×2 block in the up-sampled reconstructed video was derived is added to said 2×2 block in the up-sampled reconstructed video.

Throughout the above, the term bitstream may be replaced by stream or bytestream or NALU stream as appropriate.

Certain variations and implementation details of the temporal prediction will now be described, including certain aspects of temporal signalling.

In certain examples described herein, information from two or more frames of video that relate to different time samples may be used. This may be described as a temporal mode, e.g. as it relates to information from different times. As described herein, a step of encoding one or more sets of residuals may utilise a temporal buffer that is arranged to store information relating to a previous frame of video. In one case, a step of encoding a set of residuals may comprise deriving a set of temporal coefficients from the temporal buffer and using the retrieved set of temporal coefficients to modify a current set of coefficients. "Coefficients", in these examples, may comprise transformed residuals, e.g. as defined with reference to one or more coding units of a frame of a video stream—approaches may be applied to both residuals and coefficients. In certain cases, asymmetric methods at the encoder and decoder may be used. For example, as shown in FIGS. 1 to 4B, encoding may implement temporal processing based on coefficients (e.g. transformed residuals) whereas decoding may implement temporal processing based on residuals (e.g. level 2 residuals in FIG. 4A). In certain cases, the modifying at the encoder may comprise subtracting the set of temporal coefficients from the current set of coefficients. This approach may be applied to multiple sets of coefficients, e.g. those relating to a level 2 stream and those relating to a level 1 stream. The modification of a current set of coefficients may be performed selectively, e.g. with reference to a coding unit within a frame of video data.

Temporal aspects may be applied at both the encoding and decoding stages. Use of a temporal buffer is shown in the encoders 300, 380 of FIGS. 3A and 3B and in the decoders 400, 480 of FIGS. 4A and 4B. As described herein, prior to modifying a current set of coefficients at an encoder, the current set of coefficients may be one or more of ranked and transformed. In one case, dequantized transformed coefficients—$dqC_{x,y,n-1}$—from a previous encoded (n−1) frame at a corresponding position (e.g. a same position or mapped position) are used to predict the coefficients $C_{x,y,n}$ in a frame to be encoded (n). If a 4×4 transform is used, x, y may be in the range [0,3]; if a 2×2 transform is used x,y may be in the range [0,1]. Dequantized coefficients may be generated by an inverse quantize block or operation. For example, in FIGS. 3A and 3B, dequantized coefficients are generated by inverse quantize components 358, 360. Using dequantized coefficients, e.g. coefficients for a previous frame that have been quantized and then dequantized, may allow for certain correction of features introduced by (lossy) quantization. In other examples, unquantized coefficients may be taken and buffered prior to quantization. Either approach may be used.

In certain examples, there may be at least two temporal modes:

A first temporal mode that does not use the temporal buffer or that uses the temporal buffer with all zero values. The first temporal mode may be seen as an intra-frame mode as it only uses information from within a current frame. In the first temporal mode, following any applied ranking and transformation, coefficients may be quantized without modification based on information from one or more previous frames.

A second temporal mode that makes use of the temporal buffer, e.g. that uses a temporal buffer with possible non-zero values. The second temporal mode may be seen as an inter-frame mode as it uses information from outside a current frame, e.g. from multiple frames. In the second temporal mode, following any applied ranking and transformation, previous frame dequantized coefficients may be subtracted from the coefficients to be quantized—$C_{x,y,n,inter} = C_{x,y,n} - dqC_{x,y,n-1}$.

Figure 5A:
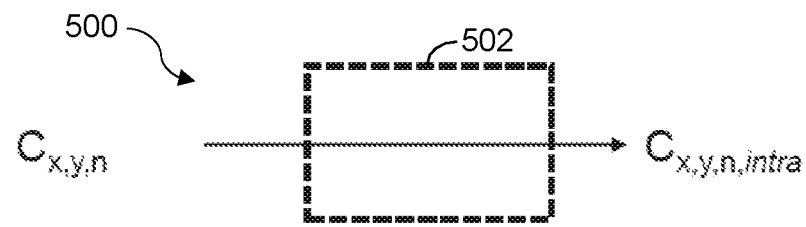
FIGS. 5A to 5C show example operations in the encoder for two respective temporal modes.
Figure 5B:
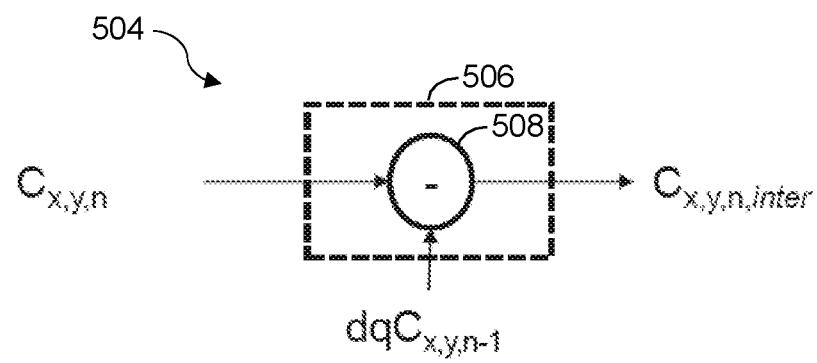

In one case, a first temporal mode may be applied by performing a subtraction with a set of zeroed temporal coefficients. In another case, the subtraction may be performed selectively based on temporal signalling data. FIGS. 5A and 5B show example operations in the encoder for two respective temporal modes. A first example 500 in FIG. 5A shows a set of coefficients being generated by an encoding component 502 in a first temporal mode—$C_{x,y,n,intra}$. These are then passed for quantization. A second example 504 in FIG. 5B shows a set of coefficients being generated by an encoding component 506 in a second temporal mode—$C_{x,y,n,inter}$—by subtraction 508 as described above and are then passed for quantization. The quantized coefficients in both case are then encoded as per FIGS. 3A and 3B. It should be noted that in other examples, a temporal mode may be applied after quantization, or at another point in the encoding pipeline.

Each of the two temporal modes may be signalled. Temporal signalling may be provided between an encoder and a decoder. The two temporal modes may be selectable within a video stream, e.g. different modes may be applied to different portions of the video stream. The temporal mode may also or alternatively be signalled for the whole video stream. Temporal signalling may form part of metadata that is transmitted to the decoder, e.g. from the encoder. Temporal signalling may be encoded.

In one case, a global configuration variable may be defined for a video stream, e.g. for a plurality of frames within the video stream. For example, this may comprise a temporal_enabled flag, where a value of 0 indicates the first temporal mode and a value of 1 indicates a second temporal mode. In other cases, as well or, or instead of the global configuration value, each frame or "picture" within a video stream may be assigned a flag indicating the temporal mode. If a temporal_enabled flag is used as a global configuration variable this may be set by the encoder and communicated to the decoder. Flag values may be selected so as to reduce a quantity of data that needs to be transmitted within the bitstream (e.g. values of 0 may be compressed using run-length encoding as described in more detail below).

Figure 5C:
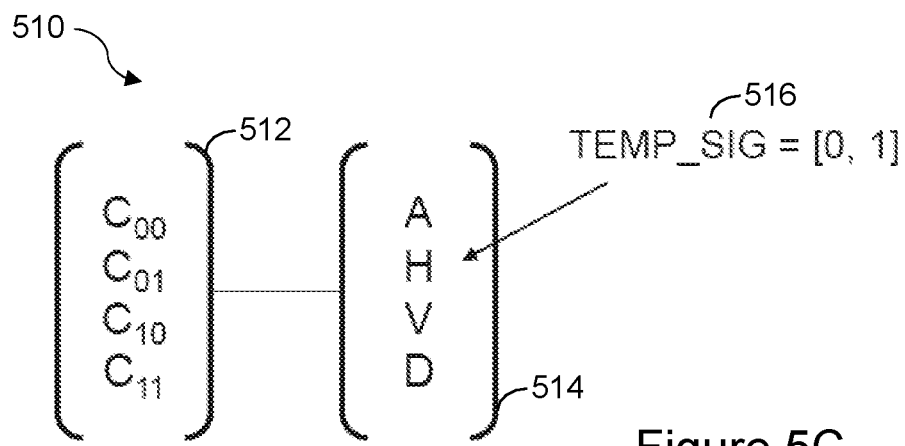

In certain cases, one or more portions of a frame of a video stream may be assigned a variable that indicates a temporal mode for the portions. For example, the portions may comprise coding units or blocks, e.g. 2×2 or 4×4 areas that are transformed by a 2×2 or 4×4 transform matrix. In certain cases, each coding unit may be assigned a variable that indicates a temporal mode. For example, a value of 1 may indicate a first temporal mode (e.g. that the unit is an "intra" unit) and a value of 0 may indicate a second temporal mode (e.g. that the unit is an "inter" unit). The variable associated with each portion may be signalled between the encoder and the decoder. The values of 0 and 1 are provided as an example only, in certain cases these values may be assigned to different modes, e.g. to reduce a signalling cost. In one case, this may be performed by setting one of the transformed coefficients to the variable value, e.g. this may be signalled by setting an H coefficient for a 2×2 coding unit or an HH coefficient for a 4×4 coding unit to the variable value (e.g. 0 or 1). In another case, each coding unit may comprise metadata and/or side-band signalling that indicates the temporal mode. FIG. 5C shows an example 510 of the former case. In this example 510, there are four coefficients 512 that result from a 2×2 transformation. These four coefficients 512 may be generated by transforming a 2×2 coding unit of residuals (e.g. for a given plane). When a Hadamard transform is used, the four coefficients may be referred to as A, H, V and D components 514 respectively representing Average, Horizontal, Vertical and Diagonal aspects within the coding unit. In the example 510 of FIG. 5C, the H component is used to signal a temporal mode, as shown by 516.

Temporal processing may be selectively applied at the encoder and/or the decoder based on an indicated temporal mode. Temporal signalling within metadata and/or a sideband channel for portions of a frame of an enhancement stream may be encoded, e.g. with run-length encoding or the like to reduce the size of the data that is to be transmitted to the decoder. Temporal signalling in this case may be structured as a temporal surface, where the surface has a size of coding_units_width×coding_units_height, e.g. a bitmap or other image having a size equal to the picture width and height divided by the coding unit size (i.e. the number of coding units in each picture dimension). The temporal surface may be seen as analogous to encoded coefficient surfaces, e.g. all A components for a plane of a video frame may be encoded as an "A" surface (etc. for the other coefficients). Run-length encoding may be advantageous for small portions, e.g. coding units and/or tiles, where there are a few temporal modes (e.g. as this metadata may comprise streams of '0's and '1's with sequences of repeated values).

In certain cases, a cost of each temporal mode for at least a portion of video may be estimated. This may be performed at the encoder or in a different device. In certain cases, a temporal mode with a smaller cost is selected and signalled. In the encoder, this may be performed by the temporal selection block 334 and/or the temporal mode selection blocks 362, 364 shown in FIGS. 3A and 3B. A decoder may then decode the signalling and apply the selected temporal mode, e.g. as instructed by the encoder. The cost function may be based on data to be sent to the decoder, including encoded residual data and signalling data.

Costing may be performed on a per frame basis and/or on a per portion basis, e.g. per tile and/or per coding unit. In the latter case, a result of a costing evaluation may be used to set the temporal mode variable for the coding unit prior to quantization and encoding.

In certain cases, a map may be provided that indicates an initial temporal mode for a frame, or a set of portions of a frame, of video. This map may be used by the encoder. In one case, a temporal_type variable may be obtained by the encoded for use in cost estimation as described in more detail below.

In one case, a cost that is used to select a temporal mode may be controllable, e.g. by setting a parameter in a configuration file. In one case, a cost that is used to select a temporal mode may be based on a difference between an input frame and one or more sets of residuals (e.g. as reconstructed). In another case, a cost function may be based on a difference between an input frame and a reconstructed frame. The cost for each temporal mode may be evaluated and the mode having the smallest cost may be selected. The cost may be based on a sum of absolute differences (SAD) computation. The cost may be evaluated in this manner per frame and/or per coding unit.

For example, a first cost function may be based on $J_o = \text{Sum}(\text{abs}(I_{x,y,n} - R_{x,y,v,o}))$, where $I_{x,y,n}$ is an input value (e.g. from an input video 102), $R_{x,y,v,o}$ is a reconstructed residual and o is intra or inter frame (i.e. indicates a first or second temporal mode). The cost function may be evaluated using reconstructed residuals from each temporal mode and then the results of the cost function may be compared for each temporal mode. A second cost function may be based on additional terms that apply a penalty for non-zero quantized coefficients and/or based on values of one or more directional components if these are used for signalling (e.g. following transformation). In the second case, the second cost function may be based on $Jo = \text{Sum}(\text{abs}(I_{x,y,n} - R_{x,y,v,o}))$ step_width$AA^*\text{Sum}((qC_{x,y,n,o}!=0) + ((o==\text{intra}) \& (qC_{0,3,n,intra}==0)))$, where the step width is a configurable weight or multiplier that may be tuned empirically, $qC_{x,y,n,o}$ is a quantized coefficient and $qC_{0,3,n,intra}$ is a coefficient that relates to an H (for a 2×2 transform) or HH (for a 4×4 transform) element. In other cases, where a side-band signalling in used, a cost of setting these bits to 1 may be incorporated into the second cost function. For the first temporal mode (e.g. an intra mode), residuals may be reconstructed according to $R_{x,y,n,intra} = \text{Transform}(dqC_{x,y,n,intra})$, where "dq" indicates dequantized. For a second temporal mode (e.g. an inter mode), residuals may be reconstructed according to $R_{x,y,n,inter} = \text{Transform}(dqC_{x,y,n,inter} + dqC_{x,y,n-1})$. "Transform" in both cases may indicate an inverse transform of the coefficients. If a transform matrix is a self-inverse matrix then a common or shared matrix may be used for both forward and inverse transformations. As before, the temporal mode that is used may be indicated in signalling information, e.g. metadata and/or a set parameter value. This signalling information may be referred to as temporal mode signalling data. The encoder may be configured to generate the temporal mode signalling data indicating the temporal mode for one or more encoded enhancement streams for the decoder. The encoder may compress the temporal mode signalling data, e.g. by encoding the temporal mode signalling data, for example using run-length encoding as discussed further below.

The cost function may incorporate a cost of sending the temporal mode signalling data, as in the second cost function described above. In this way, the cost of sending temporal mode signalling data for the temporal mode may penalise one value of the temporal mode signalling data as compared to other values of the temporal mode signalling data.

In one case, the cost may be evaluated at the encoder. For example, the temporal selection block may evaluate the cost. In other cases, the cost may be evaluated by a separate entity (e.g. a remote server during pre-processing of a video stream) and the temporal mode signalled to the encoder and/decoder. In either case, the encoder may be configured to determine the temporal mode based on the cost function.

If the second temporal mode is selected (e.g. inter frame processing), then modified quantized coefficients (e.g. output by the subtraction block 354, 356 between transform 348, 336 and quantize 350, 336 in FIG. 3B) are then sent for entropy encoding 352, 340. The dequantized values of these coefficients, obtained by dequantizing 358, 360 these coefficients, may then be kept for temporal prediction of the next frame, e.g. frame n+1. Although FIG. 3B shows two separate inverse quantize operations 342, 360 for a level 1 stream, it should be noted that these may comprise a single common inverse quantize operation in certain cases.

Temporal mode selection and temporal prediction may be applied to one or more of the level 2 and level 1 streams shown in FIG. 3B (e.g. to one or both sets of residuals). In certain cases, a temporal mode may be separately configured and/or signalled for each stream.

As described in later sections, in certain examples, a second temporal mode may utilise a temporal refresh parameter. This parameter may signal when a temporal buffer is to be refreshed, e.g. where a first set of values stored in the temporal buffer are to be replaced with a second set of values. Temporal refresh may be applied at one or more of the encoder and the decoder. If a decoder uses a temporal buffer that stores residual rather than coefficient values, the temporal refresh may be applied to that buffer.

In the encoder, a temporal buffer may store dequantized coefficients for a previous frame that are loaded when a temporal refresh flag is set (e.g. is equal to 1 indicating "refresh"). The temporal buffer may be any one of the temporal buffers 130, 132, 230, 232, 330, 332, 430, 432. In this case, the dequantized coefficients are stored in the temporal buffer and used for temporal prediction for future frames (e.g. for subtraction) while the temporal refresh flag for a frame is unset (e.g. is equal to 0 indicating "no refresh"). In this case, when a frame is received that has an associated temporal refresh flag set to 1, the contents of the temporal buffer are replaced. This may be performed on a per frame basis and/or applied for portions of a frame such as tiles or coding units. As set out above, references to "frames" herein also apply to planes of a frame for a colour video (e.g. where a plane and a frame may be the same for a monochrome video).

A temporal refresh parameter may be useful for a set of frames representing a slow-changing or relatively static scene, e.g. a first shot for the set of frames may be used for subsequent frames in the scene. When the scene changes again, a first frame in a set of frames for the next scene may indicate that temporal refresh is again required. This may help speed up temporal prediction operations.

A temporal refresh operation for a temporal buffer may be effected by zeroing all values with the temporal buffer.

A temporal refresh parameter may be signalled to the decoder by the encoder, e.g. as a binary temporal_refresh_bit where 1 indicates that the decoder is to refresh the temporal buffer for a particular encoded stream (e.g. level 0 or level 1).

As described herein, in certain examples, data may be grouped into tiles, e.g. 32×32 blocks of an image. In this case, a temporal refresh operation, e.g. as described above, may be performed on a tile-by-tile basis for a frame, e.g. where coefficients are stored in the temporal buffer and may be addressed by tile. A mechanism for tiled temporal refresh may be applied asymmetrically at the encoder and the decoder.

In one case, a temporal processing operation may be performed at the encoder to determine temporal refresh logic on a per frame or per block/coding unit basis. In certain cases, the signalling for a temporal refresh at the decoder may be adapted to conserve a number of bits that are transmitted to the decoder from the encoder.

Figure 6A:
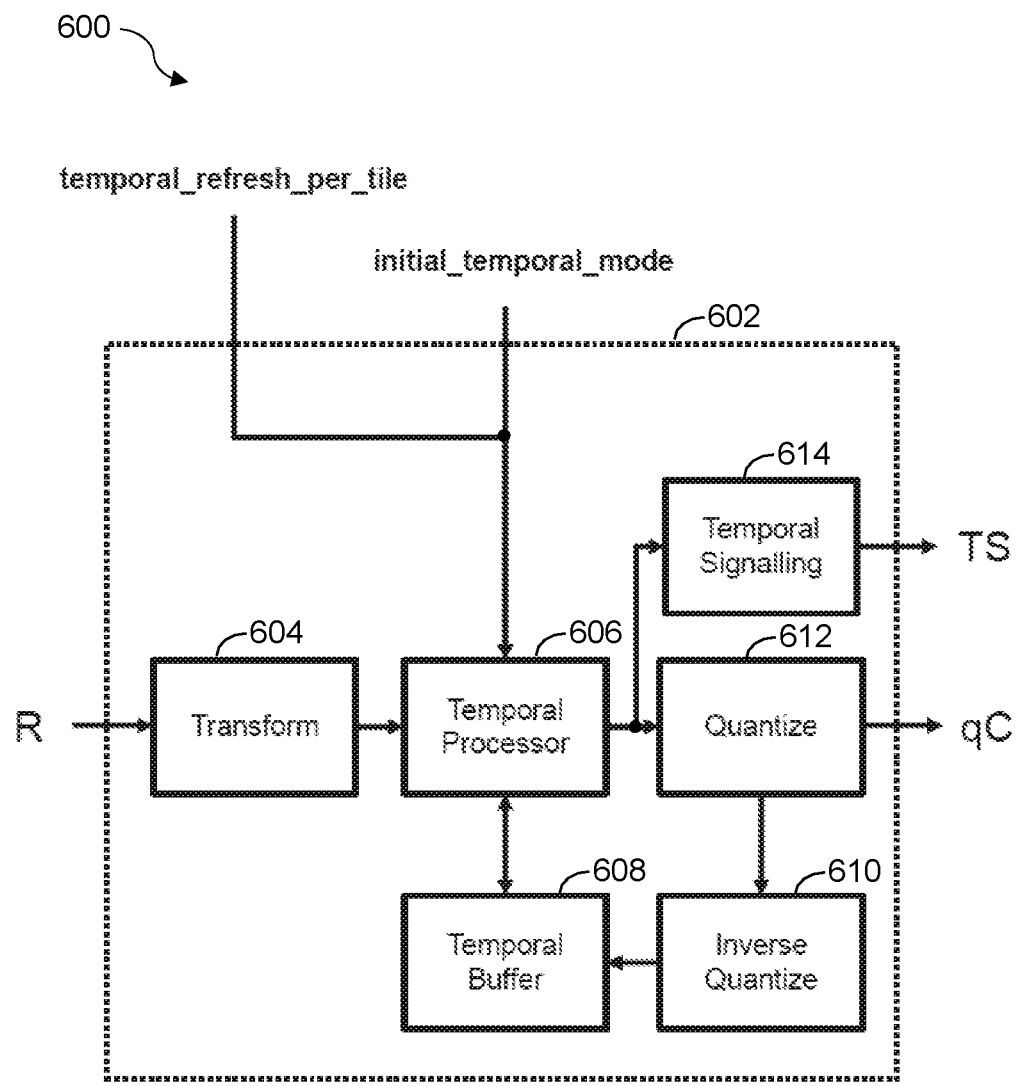
FIGS. 6A to 6E are schematic diagrams illustrating various features of a temporal prediction process according to examples herein.

FIG. 6A shows an example 600 of temporal processing that may be performed at the encoder. FIG. 6A shows a temporal processing subunit 602 of an example encoder. This encoder may be based on the encoder 300, 380 of FIG. 3A or 3B. The temporal processing subunit 602 receives a set of residuals indicated as R. These may be level 2 or level 1 residuals as described herein. They may comprise a set of ranked and filtered residuals or a set of unranked and unfiltered residuals. The temporal processing subunit 602 outputs a set of quantized coefficients, indicated as qC, that may then be entropy encoded. In the present example, the temporal processing subunit 602 also outputs temporal signalling data, indicated as TS, for communication to the decoder. The temporal signalling data TS may be encoded together with, or separately from, the quantized coefficients. The temporal signalling data TS may be provided as header data and/or as part of a side-band signalling channel. The temporal signalling data may comprise data indicating the temporal mode of each coding unit (e.g. a variable TransTempSig for each coding unit). Additionally, or alternatively, the temporal signalling data may comprise data indicating the temporal mode of each tile (e.g. a variable TileTempSig for each tile). In this way, the tiled temporal refresh may be signalled to the decoder via part of a side-band signalling channel, encoded separately from the quantized coefficients.

In the example 600 of FIG. 6A, the residuals (R) are received by a transform component 604. This may correspond to the transform component of other examples, e.g. one of the components arranged to perform the transform step 336, 348 in FIGS. 3A and 3B. The transform component 604 outputs transform coefficients as described herein (i.e. transformed residuals). The temporal processing subunit 602 also comprises a central temporal processor 606. This also receives metadata in the form of a tile-based temporal refresh parameter temporal_refresh_per_tile and an estimate of a temporal mode initial_temporal_mode. The estimate of temporal mode may be provided per coding unit of a frame and the tile-based temporal refresh parameter may be provided per tile. For example, if a 2×2 transform is used, then a coding unit relates to a 2×2 area, and in a 32×32 tile there are 16×16 such areas, and so 256 coding units. The metadata may be generated by another subunit of the encoder, e.g. in a pre-processing operation and/or may be supplied to the encoder, e.g. via a network Application Programming Interface.

In the example of FIG. 6A, the temporal processor 606 receives the metadata and is configured to determine a temporal mode for each coding unit and a value for a temporal refresh bit for the whole frame or picture. The temporal processor 606 controls the application of a temporal buffer 608. The temporal buffer 608 may correspond to the temporal buffer of previous examples as referenced above. The temporal buffer 608 receives de- or inverse quantized coefficients from an inverse quantize component 610, which may correspond to one of the inverse quantize components 358, 360 in FIGS. 3A and 3B. The inverse quantize component 610 is communicatively coupled in turn to an output of a quantize component 612, which may correspond to one of quantize components 338, 350 in FIGS. 3A and 3B. The temporal processor 606 may implement certain functions of the temporal mode selection components 362, 364 as shown in FIGS. 3A and 3B. Although, FIG. 6A shows a certain coupling between the quantize component 612, the inverse quantize component 610 and the temporal buffer 608, in other examples, the temporal buffer 608 may receive an output of the temporal processor 606 before quantization and so the inverse quantize component 610 may be omitted. In FIG. 6A, a temporal signalling component 614 is also shown that generates the temporal signalling TS based on operation of the temporal processor 606.

Figure 6B:
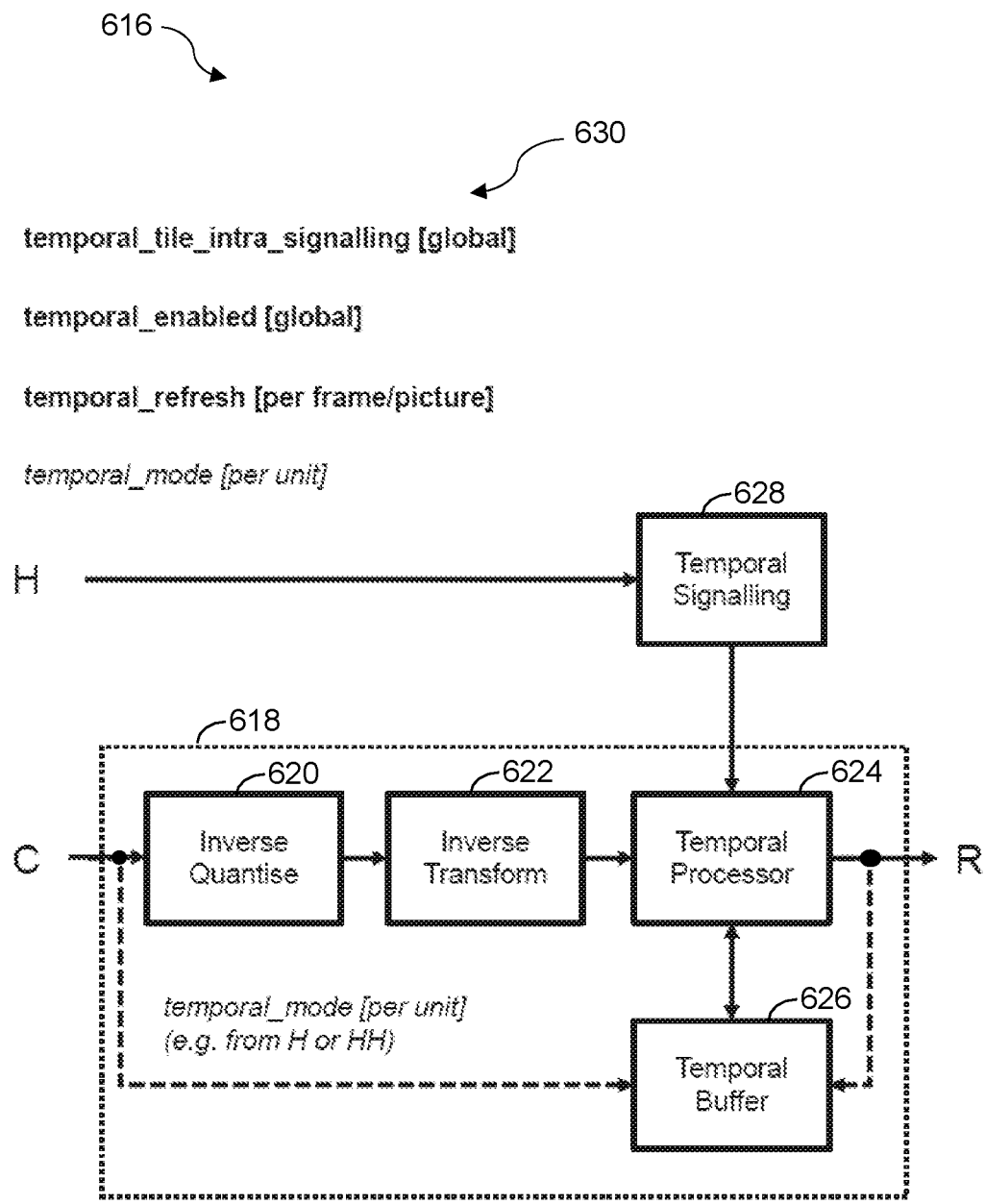

FIG. 6B shows a corresponding example decoder 616 where the decoder receives a temporal_refresh bit per frame and a temporal_mode bit per coding unit. As discussed above, in certain cases the temporal mode for each coding unit may be set within the encoded coefficients, e.g. by replacing an H or HH value within the coefficients. In other examples, the temporal mode for each coding unit may be sent via additional signalling information, e.g. via a sideband and/or as part of frame metadata. This may be described as using a temporal surface that provides the temporal signalling.

In the example decoder 616 of FIG. 6B, a temporal processing subunit 618 is provided at the decoder. This may implement at least a portion of a level 1 or level 2 decoding component. The temporal processing subunit 618 comprises an inverse quantize component 620, an inverse transform component 622, a temporal processor 624 and a temporal buffer 626. The inverse quantize component 620 and the inverse transform component 622 may comprise implementations of the inverse quantize components 454, 456 and the inverse transform components 458, 460 shown in FIGS. 4A and 4B. The temporal processor 624 may correspond to functionality applied by the temporal prediction component 466 and the summation 468, or by the temporal prediction component 466 and the summation 472. The temporal buffer 626 may correspond to one of the temporal buffers 430, 432. In FIG. 6B, there is also a temporal signalling component 628 that receives data 630 that is, in this example, indicated in a set of headers H for the bitstream. These headers H may correspond to the headers 436 of FIG. 4B. It should be noted that the temporal subunits 602, 618 may, in certain cases, be implemented with respective encoders and decoders that differ from the other examples herein.

In certain cases, when a temporal mode is enabled, e.g. as set by a global temporal_enabled bit, the temporal processor 606 of FIG. 6A is configured to use the tile-based temporal refresh parameter temporal_refresh_per_tile and the estimate of the temporal mode initial_temporal_mode and to determine values for the temporal mode for each coding unit and the temporal_refresh_bit for the whole frame that improve communication efficiency between the encoder and the decoder.

In one case, the temporal processor 606 may determine costs based on the estimate of the temporal modes initial_temporal_mode and use these costs to set the values that are communicated to the decoder.

In one case, the temporal processor 606 may initially determine whether a per frame refresh should be performed and signalled based on percentages of different estimated temporal modes across the set of coding units for the frame, e.g. where the coding units have an initial estimate of the temporal mode. For example, first, all coding units of both estimated temporal modes (e.g. elements associated with a 2×2 or 4×4 transform) may be ignored if they have a zero sum of absolute differences (e.g. cases where there is no residual). A refresh bit for the frame may then be estimated based on proportions (e.g. percentages) of non-zero coding units. In certain examples, a refresh operation for the contents of a temporal buffer may be set based on a percentage of coding units that are initially estimated to relate to the first temporal mode. For example, if more than 60% of coding units that are estimated to relate to the first temporal mode in the case that temporal_refresh_per_tile is not set, or if more than 75% of coding units are deemed to relate to the first temporal mode in the case that temporal_refresh_per_tile is set, then the temporal buffer 608 may be refreshed (e.g. by zeroing values within the buffer) for the whole frame and appropriate signalling set for the decoder. In these cases, even if temporal processing is enabled (e.g. via the temporal_enabled signalling), any subtraction is performed with respect to zeroed values within the temporal buffer 608 and so temporal prediction at the decoder is inhibited similar to the first temporal mode. This may be used to revert back to the first temporal mode based on changes within the video stream (e.g. if it is a live stream) even though a second temporal mode with temporal prediction is signalled. This may improve viewing quality.

Similarly, in certain cases, even if the second temporal mode is selected for coding units and signalled to the decoder, if a frame encoded by the base encoder is set as an I or intra frame (e.g. by setting the temporal_refresh_bit for the frame), then the temporal buffer 608 is refreshed as above (e.g. effecting processing similar to the first temporal mode). This may help to ensure that Group of Pictures (GoP) boundaries of the base stream, e.g. as encoded, are respected when temporal processing is enabled.

Whether a temporal refresh is performed, e.g. for a tile, may depend on whether noise sequences are present with isolated static edges. The exact form of the cost function may depend on the implementation.

Returning to processing performed by the temporal processing subunit 602 of FIG. 6A, following a decision on whole frame refresh, a second stage may involve tile-based processing based on the temporal_refresh_per_tile bit value. This may be performed per tile for a given set of tiles for a frame. If temporal_refresh_per_tile is used, and if the flag temporal_refresh_per_tile is set in the metadata received by the temporal processor 608, then the following processing may be performed.

At a first substage, it may be checked whether a temporal buffer for a given tile is already empty. If it is, all temporal signals in the tile are zero and coding units in this tile are encoded in the second temporal mode (e.g. inter encoded), e.g. the temporal mode for the unit is set as the second mode, further temporal processing is performed in relation to this mode at the encoder, and the temporal mode is signalled to the decoder (e.g. either by setting a coefficient value or via sideband signalling). This may effectively code the tile as per the first temporal mode (e.g. intra coding) as the temporal buffer is empty. If the second temporal mode (e.g. inter mode) is set via a 0 value in the temporal mode bit, this approach may reduce the number of bits that need to be communicated to the decoder in cases where the temporal buffer will be empty.

If the flag temporal_refresh_per_tile is not set for a given tile, a first coding unit in the tile may be encoded as per the second temporal mode (e.g. as an inter unit) and temporal signalling for this tile is not set. In this case, a costing operation as described previously is performed for the other coding units within the tile (e.g. the first or second temporal mode may be determined based on a sum of absolute differences (SAD) metric). In this case, for the other coding units, the initial estimated temporal mode information is recomputed based on current (e.g. live) encoding conditions. All other coding units in the tile may be subjected to the procedure and costing steps above. The encoding of the first coding unit in the tile as the second temporal mode may be used to instruct initial temporal processing at the decoder (e.g. to instruct an initial refresh for the tile), where the temporal processing for the other coding units is performed at the decoder based on the confirmed values of the temporal_mode bit set for the coding units.

If the flag temporal_refresh_per_tile for a given tile is set and a temporal buffer for the tile is not empty, then the temporal processor may arrange for a temporal refresh of the tile, where temporal signalling is then set to instruct this at the decoder. This may be performed by setting a temporal mode value for a first coding unit to 1 and the temporal mode value for all other coding units to 0. This matter of 1 in the first coding unit and 0 in the other coding units indicates to the decoder that a refresh operation is to be performed with respect to the tile yet reduces the information to be transmitted across. In this case, the temporal processor effectively ignores the temporal mode values and encodes all the coding units as per the first temporal mode (e.g. as intra coding units without temporal prediction).

Hence, in these examples, when the temporal_refresh_per_tile is set as part of the encoder metadata, a first coding unit may be used to instruct the decoder to clean (i.e. empty) its corresponding temporal buffer at the position of that tile and the encoder logic may apply temporal processing as an appropriate temporal mode.

The approaches above may allow temporal prediction to be performed on a per tile basis based on coding units within the tile. Configurations for a given tile may be set for one coding unit within the tile. These approaches may be applied for one or more of the level 2 stream and the level 1 stream, e.g. for one or more of the sets of residuals.

In certain cases, a temporal_tile_intra_signalling global parameter may be set for a video stream to indicate that the tile refresh logic described above is to be used at the decoder.

In certain examples, the initial_temporal_mode data may be provided for a plurality of frames, e.g. for a current frame and a next frame. In these examples, the initial_temporal_mode estimate for a next frame, e.g. frame n+1, may also be used to remove quantized values that are not considered important to reduce the bit rate, the estimated temporal mode information may be used to control comparisons with one or more thresholds to instruct removal of quantized values (e.g. at one of the quantize steps 350, 338 or at one of the temporal mode selection steps 362, 364 in FIG. 3A or 3B).

In certain cases, if an initial_temporal_mode for a coding unit at the same position in a next frame is estimated to be related to the first temporal mode (e.g. an intra mode), it may be assumed that residuals to be coded in the present coding unit will disappear in the next frame and hence residuals that are smaller or equal to a given threshold may be removed. As an example, in a test case, this threshold may be set to 2, meaning all quantized values smaller than +/−3 will be removed from the coding unit.

Figure 6C:
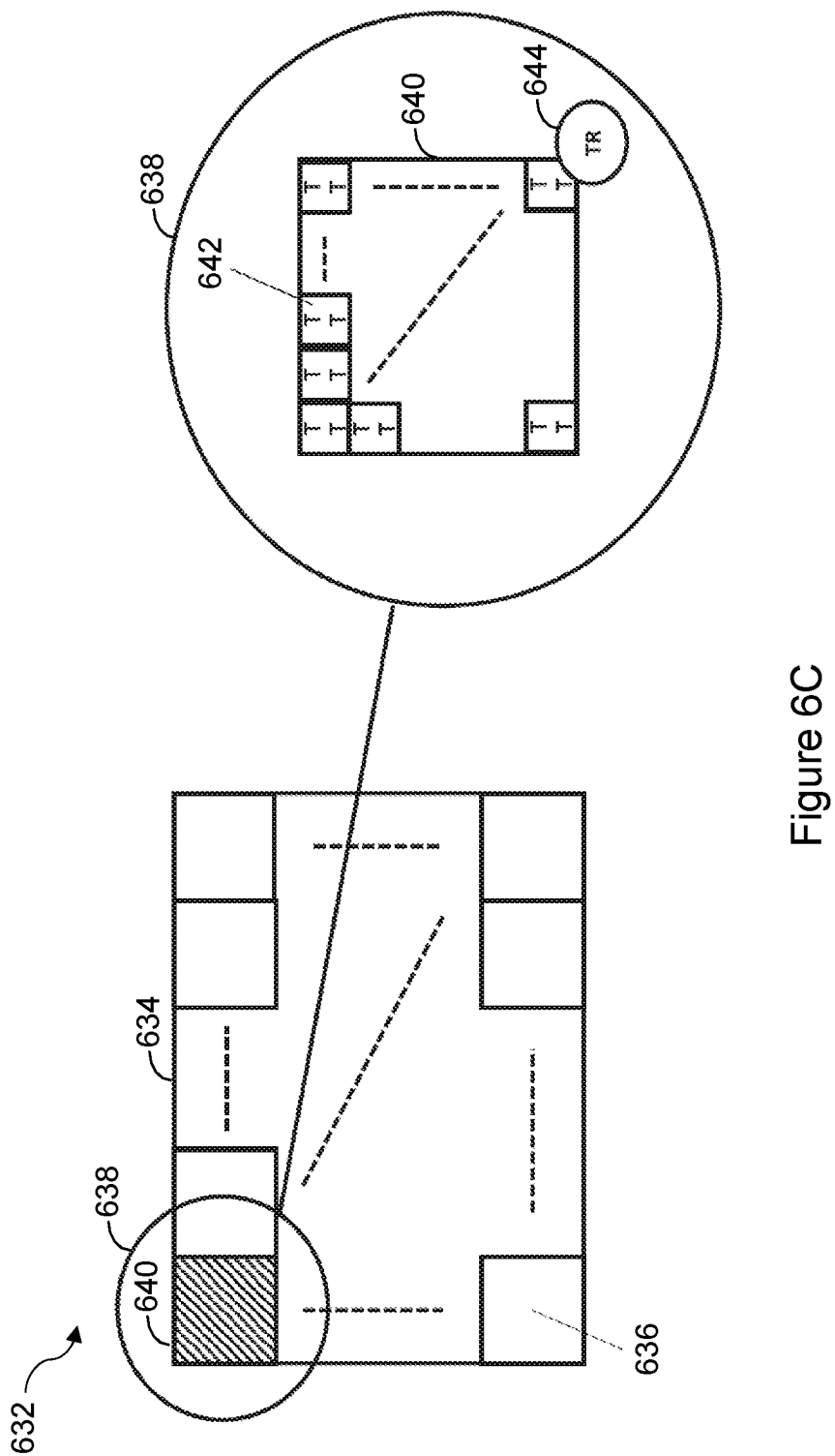

FIG. 6C shows an example 632 of how temporal signalling information may be provided for a frame (or plane) of residuals 634. The left-hand-side of FIG. 6C shows how a frame of residuals may be divided into a number of tiles 636. The right-hand-side of FIG. 6C shows how temporal signalling information may be assigned to each tile. For example, circle 638 indicates a first tile 640. In the frame 634, the tiles form a raster-like pattern of rows across the frame 634. The right-hand side shows the first tile 640 in more detail.

The circle 638 on the right-hand-side of FIG. 6C shows how each tile 640 comprises a number of units 642, which may be referred to as coding units. A unit may comprise one or more residuals. In one case, a unit may relate to a block of residuals associated with a transform operation, e.g. a 2×2 block as described herein, which may relate to a Directional Decomposition transformation (DD—described in more detail below), or a 4×4 block as described herein, which may relate to a Directional Decomposition Squared (DDS). In FIG. 6C each tile 640 has a temporal_refresh_per_tile flag (shown as "TR") and each unit 642 within the tile has a temporal_type flag 644 (shown as "TT"). This information may be obtained and used by the encoder to apply temporal encoding as described above.

As described above, in one case, temporal signalling may be provided "in-stream", e.g. as part of an enhancement stream. This may be performed by replacing a particular coefficient following transformation, e.g. the temporal signalling is embedded within the transform coefficients. In one case, a horizontal coefficient (e.g. H in a 2×2 Directional Decomposition transform or HH in a 4×4 Directional Decomposition Squared transform) may be used to signal a temporal mode for a particular coding unit. A horizontal coefficient may be used as this may minimise an effect on a reconstructed signal. In certain cases, the effect of the horizontal coefficient may be reconstructed by the inverse transform at the decoder, e.g. based on the data carried by the other coefficients in the coding block.

In another case, temporal signalling may be performed using metadata. Metadata, as used here, may be a form of side-band signalling, e.g. that does not form part of the base or enhancement streams. In one case, metadata is transmitted in a separate stream (e.g. by the encoder or a remote server) that is received by the decoder. This separate stream may be encoded, e.g. entropy encoded using run length encoding, and may be referred to as a temporal surface encoded stream. This stream may be combined with the other streams output by the encoder (e.g. base and enhancement streams) to form a combined bitstream that is transmitted to the decoder.

Although "in-stream" temporal signalling can provide certain advantages for compression, sending temporal data for a frame as a separate chunk of information, e.g. metadata, allows different and possibly more efficient entropy coding to be used for this information. In also allows temporal control and processing, e.g. as described above, to be performed without the need for received enhancement stream data. This allows the temporal buffer to be prepared and makes in-loop temporal decoding a simple additive process.

If the second temporal mode (e.g. if temporal processing is enabled) there may be three levels of temporal signalling:

At a first level, there may be per frame temporal signals. These may comprise a per frame temporal refresh signal. The per frame temporal refresh signal may be a frame-based temporal parameter. This may be a per frame refresh bit. If this is set the whole frame may be encoded without temporal prediction. A signal at this level may be used to encode the frame and may be signalled to the decoder.

At a second level, there may be per tile temporal signals. For example, these may be set per m by n tile, where m and n may be 32. Per tile temporal signals may comprise a per tile temporal refresh signal. The per tile temporal refresh signal may be a tile-based temporal parameter. This may be a per tile refresh bit. If the temporal refresh signal is set for a tile, then that whole tile is encoded without temporal information. This level of temporal signalling may be used to encode the frame. In one case, it may not be explicitly signalled to the decoder; in this case, a tile refresh signal may be indicated by a first temporal signal at a third level as described below. In another case, a per tile temporal refresh signal may be explicitly signalled to the decoder.

At a third level, there may be per block or coding unit temporal signals. These may comprise a temporal mode signal for the block. This may be signalled to the decoder. If the per tile temporal refresh signal is set to 1, and the whole tile is encoded without temporal information (e.g. according to the first temporal mode), then this may be signalled to the decoder with a one-bit per block temporal signal for the first block, which may be set to 1. If the per tile temporal refresh signal is set to 0, then the first transform block in the tile (e.g. 2×2 or 4×4 block) may be encoded with temporal prediction (e.g. using the temporal buffer). In this case, the temporal signal per block may be set to 0 indicating temporal prediction is used (e.g. encoded according to the second temporal mode). If the per tile temporal refresh signal is set to 0, all other transform blocks in the tile may have a one-bit temporal signal that is set to 1 if the tile is encoded without temporal information and that is set to 0 if the transform coefficients from the previous frame at the same spatial position are first subtracted from the transform coefficients and difference is then quantized and passed to the entropy encoder (i.e. if the second temporal mode and the temporal buffer are to be used). The temporal mode signal for the block may be a block-based temporal parameter. The bit-length of the value of block-based temporal parameter may be one bit.

Figure 6D:
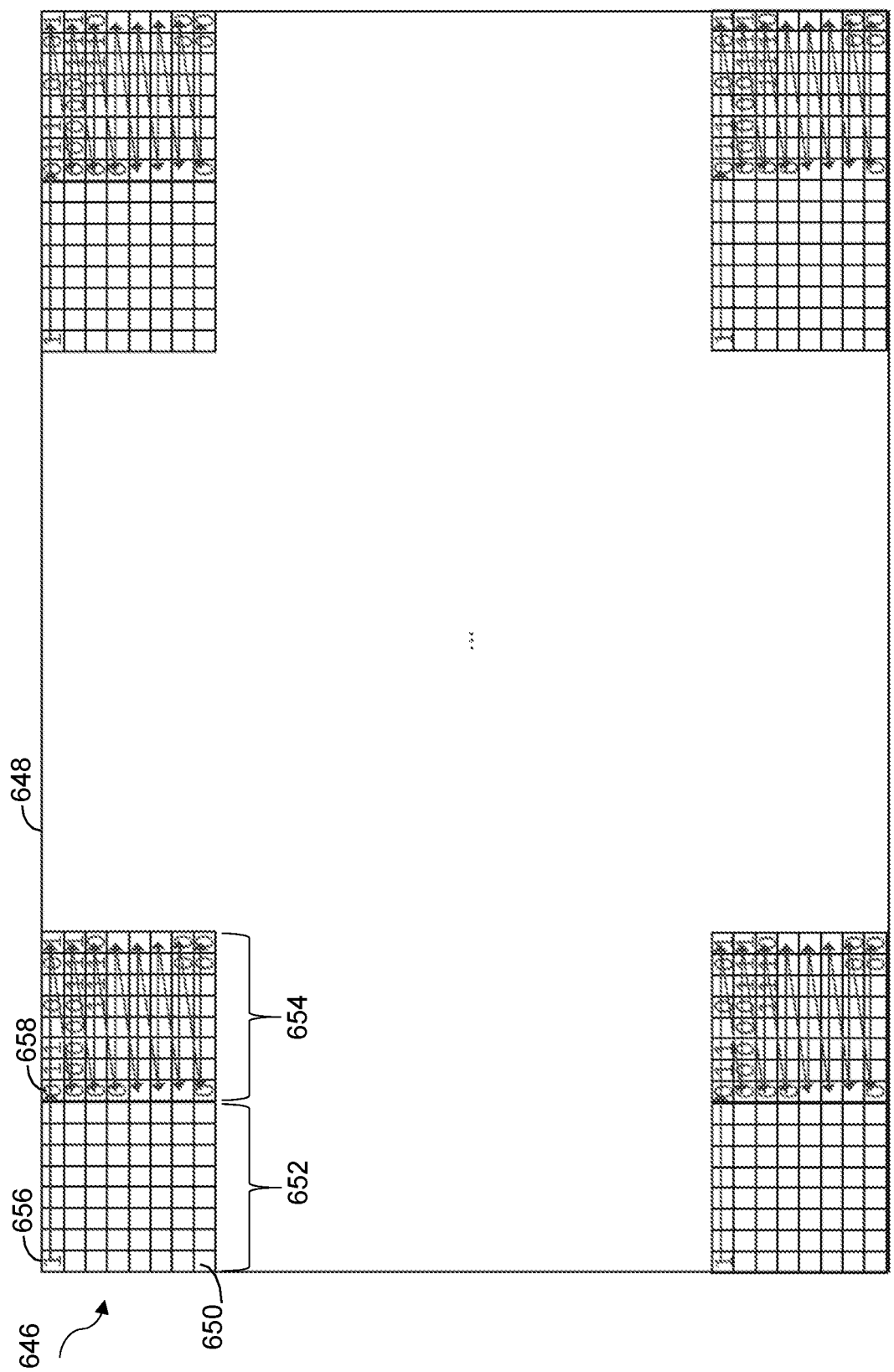

FIG. 6D shows a representation 646 of temporal signals for 4×4 transform size (e.g. a DDS transform). The data shown here (e.g. the shown values of 1 and 0) may be referred to as a temporal surface. A 2×2 transform size may be signalled in a corresponding manner. FIG. 6D shows a frame 648 of elements with a plurality of tiles 652, 654 (e.g. similar to FIG. 6C). Temporal signals are organized using the tiles 652, 654. For a 4×4 transform and a 32×32 tile, there are 8×8 temporal signals per tile (i.e. 32/4). For a 2×2 transform and a 32×32 tile, there are 16×16 temporal signals per tile (i.e. 32/2). The set of temporal signals for a frame 648 of residuals, e.g. as shown in FIG. 6D, may be referred to as a "temporal map" as an alternative term to temporal surface. The temporal map or surface may be communicated from the encoder to the decoder.

FIG. 6D shows how a temporal signal for a first transform block 656, 658 within the tile 652, 654 may indicate whether the tile is to be processed within the first or second temporal mode. The temporal signal may be a bit indicating the temporal mode. If the bit is set to 1 for the first transform block, e.g. as shown for block 656, this indicates that the tile 652 is to be decoded according to the first temporal mode, e.g. without use of the temporal buffer. In this case, bits for the other transform blocks may not be set. This can reduce the amount of temporal data that is transmitted to the decoder. For example, in the first tile 652, only one bit value (1) is used for the temporal signalling as compared to the second tile 654 where there are multiple values (one per coding unit). If the temporal signalling bit of the first transform block is set to 0, e.g. as shown for block 658, this indicates in FIG. 6D that the tile 654 is to be decoded according to the second temporal mode, e.g. with temporal prediction and use of the temporal buffer. In this case, the temporal signalling bits of the remaining transform blocks are set to either 0 or 1, providing a level of temporal control at the (third) per block level. The values to indicate the temporal mode (e.g. 0 or 1) may be assigned in a manner that leads to a reduced level of signalling between the encoder and decoder.

In certain cases, the temporal signalling at the third level, as described above, may be efficiently encoded if it is sent as metadata (e.g. sideband data).

In the case described above, and e.g. as shown in FIG. 6D, the temporal surface or map for a frame may be sent to a run-length encoder (e.g. where a frame is a "picture" of encoded residuals). The temporal surface may be efficiently encoded using run length encoding. The run-length encoding may be performed using the same run-length encoder used in the "Entropy Coding" component of one or more of the first and second enhancement streams (or a copy of this encoder process). In other cases, a different run-length encoder may be used.

If run-length encoding is to be used, then when the temporal surface is received by the run-length encoder several operations may occur. In one case, if first temporal signal in the tile is 1, the temporal signalling for the rest of the tile is skipped. This is shown by the arrow from the first transform block 656 with a value of 1. In this case, if the first temporal signal in the tile is 0, e.g. as shown for the subsequent tiles 654 in FIG. 6D, the temporal signalling bits for the tile may be scanned line by line (e.g. along a first row of transform blocks before moving to the next row of transform blocks, at each step moving to a next column of transform blocks). In FIG. 6D, each tile has 8 rows and 8 columns, so for a 0 bit, an iteration is performed over the first 8 columns of the first row, and then the iteration is repeated for the same 8 columns for the second row, and so on until all the temporal signals for the transform blocks for that particular tile are encoded.

Figure 6E:
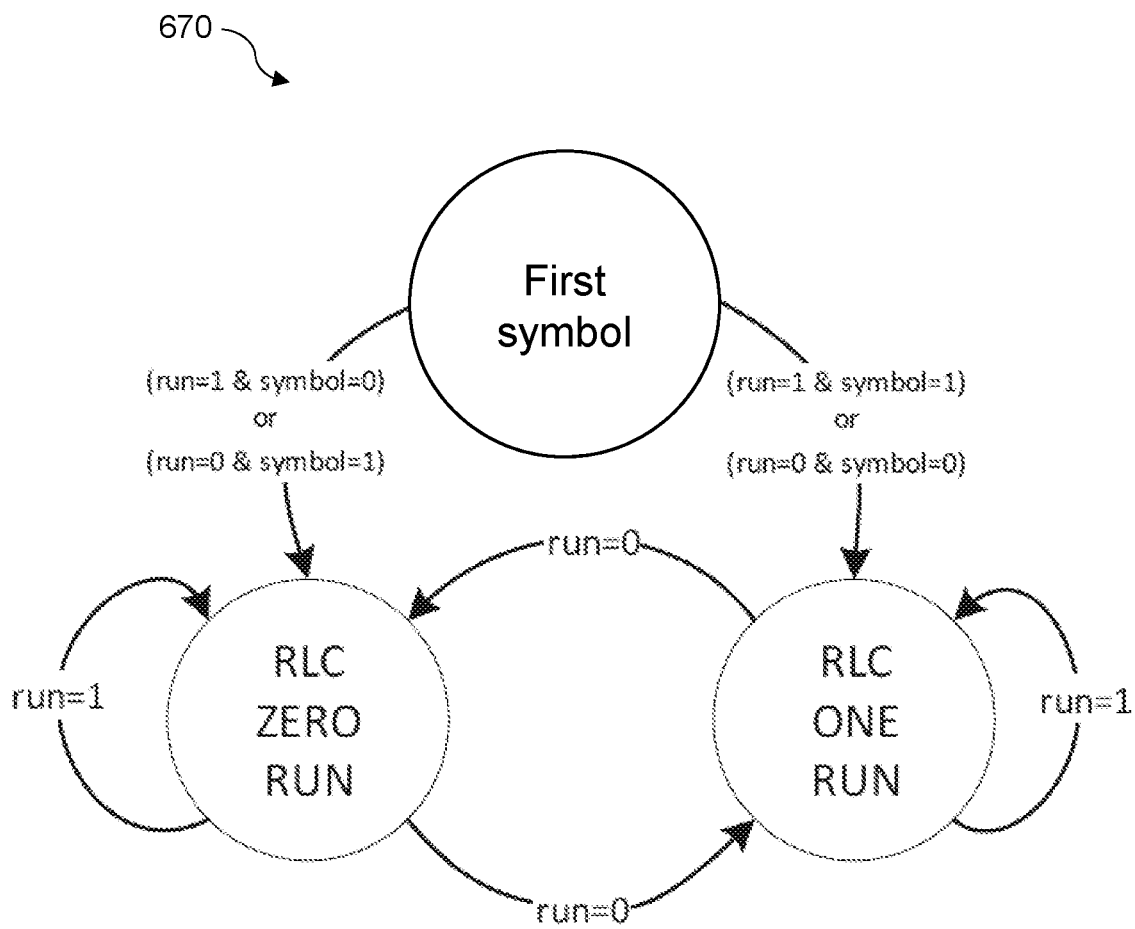

In one case, a run-length encoder for the temporal signals may have two states, representing bit values of 0 and 1 (i.e. second temporal mode and first temporal mode). These may be used to encodes runs of 1s and runs of 0s. In one case, the run-length encoder may encode runs byte by byte, using 7 bits per byte to encode the run and bit 7 to encode either that more bits are needed to encode the run (set to 1) or that context is changed. By convention, the first symbol in the stream is always coded as 0 or 1, so decoder can initialize the state machine. A state machine 670 that may be used is shown in FIG. 6E.

In an example, the cost function used by the encoder to determine the temporal mode (as described above) may incorporate a cost of stopping the encoding of a run of the same value, e.g. when encoding temporal mode signalling data as discussed above, indicating a run of temporal mode values. In this way, the cost function may apply a penalty when a run of 1s changes to a run of 0s or vice versa. This accounts for the fact that stopping the encoding of a run is entropically significant during run-length encoding. Evaluating the cost function may comprise a Rate Distortion Optimization (RDO) decision which penalises a change in runs of the same value.

In one case, the information generated by the run-length encoder may be sent to a further entropy encoder component. This may comprise a Huffman encoder. A Huffman encoder may write into a metadata stream two Huffman codes for each state and Huffman encoded values. The run-length encoding and entropy encoding may thus use existing entropy coding components and/or suitably adapted duplicates of these components (e.g. as suitably initialised threads). This may simplify the encoding and decoding, as components may be re-used with different configuration information. In one case, with two temporal mode values (e.g. 0 and 1), just run-length encoding may be used as there may be no benefit in additional Huffman encoding due to the limited number of symbols to encode.

Figure 7A:
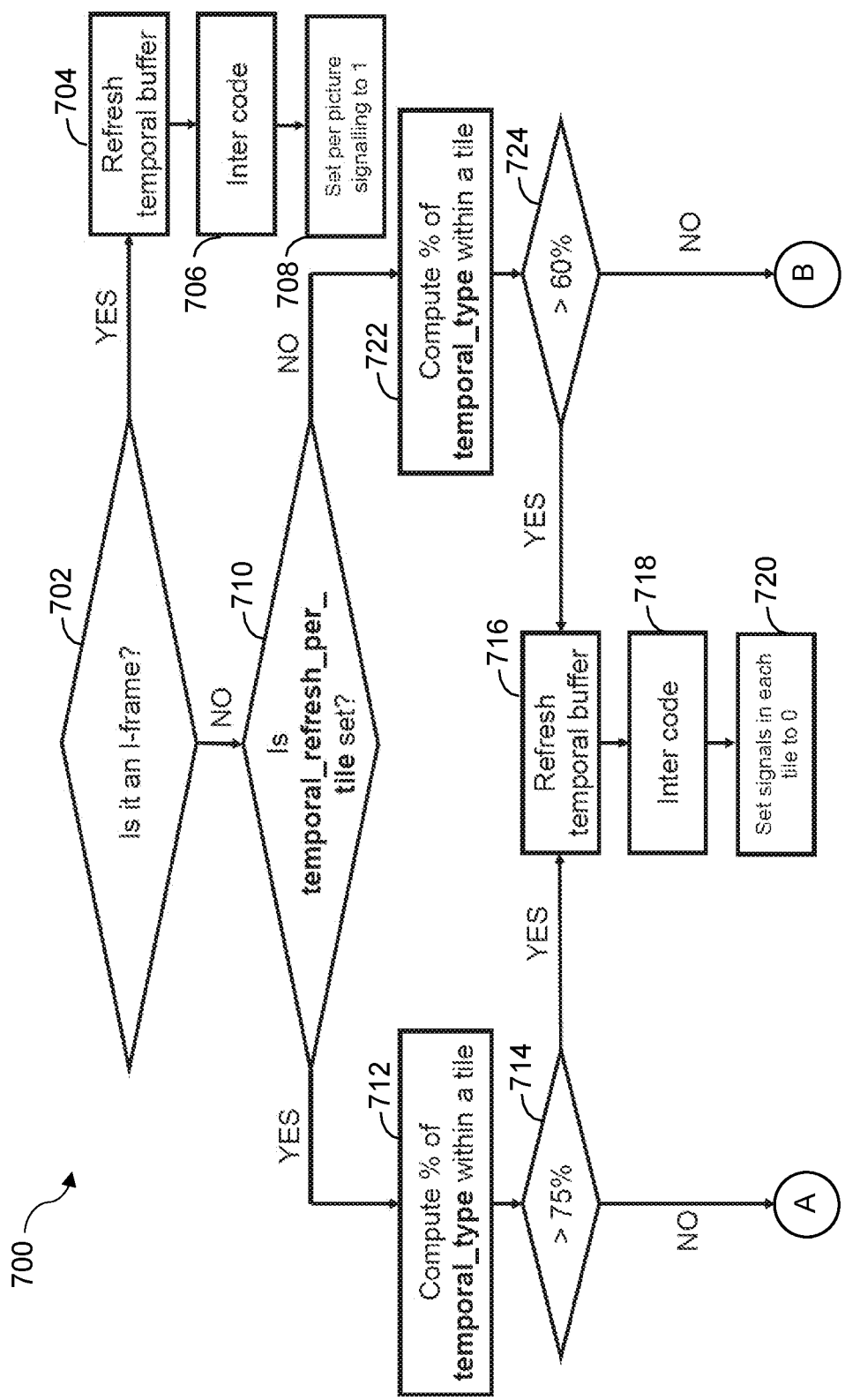
FIGS. 7A and 7B are two halves of a flow chart showing a method of temporal processing according to an example.
Figure 7B:
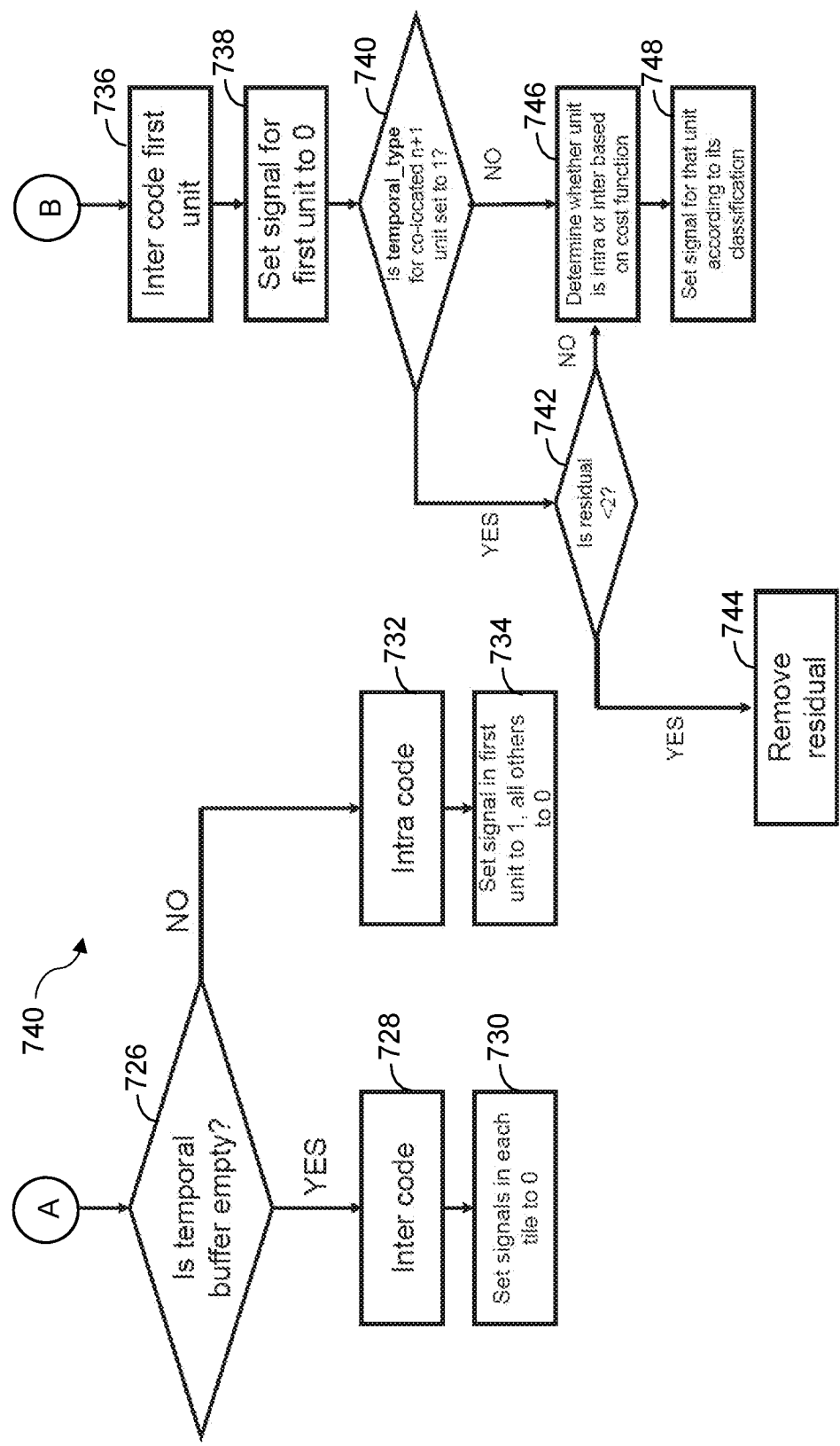

FIGS. 7A and 7B are two halves 700, 740 of a flow chart showing a method of temporal processing according to an example. The method of temporal processing may be performed at the encoder. The method of temporal processing may implement certain processes described above. The method of processing may be applied to the frame of residuals shown in FIG. 6C.

At a first block 702, a check is made as to whether a current frame of residuals is an I-frame (i.e. an intra-coded frame). If the current frame of residuals is an I-frame then the temporal buffer is refreshed at block 704, and the current frame of residuals is encoded as an Inter-frame at block 706 with per picture signalling set to 1 at block 708.

If the current frame of residuals is determined not to be an I-frame at block 702, then a first tile is selected and a check is made at block 710 to determine whether the temporal_refresh_per_tile flag is set (e.g. has a value of 1). This may be the TR variable 644 as shown on the right-hand-side of FIG. 6C. If the temporal_refresh_per_tile flag is set, then at a next block 712 the temporal_type flags of the units within the current tile are analyzed. For example, for a first tile, these may be the temporal_type flags of the units shown on the right-hand-side of FIG. 6C. At the next block 714, a percentage of I or first temporal mode flag values may be counted (e.g. values of '1'). If these are greater than 75%, then the temporal buffer is refreshed at block 716 and the tile is inter coded at block 718, with the temporal signals in each tile set to 0 at block 720. If these are less than 75%, the method proceeds to FIG. 7B (e.g. via node A). A similar process takes place if the temporal_refresh_per_tile is not set (e.g. has a value of 0), where a check at block 722 is made to analyse the temporal_type flags of the units and at block 724 it is determined whether more than 60% of the temporal_type flags of the units within the current tile are set to an I or first temporal mode (e.g. have values of '1'). If this is the case, a similar process as per the previous 75% check takes place (e.g. blocks 716, 718 and 720 are performed). If less than 60% of the temporal_type flags of the units within the current tile are set to an I or first temporal mode, then the method again proceeds to FIG. 7B (e.g. via node B).

Turning to the second half 740 of the flow chart in FIG. 7B, and starting with the node A at the left-hand-side of FIG. 7B, if less than 75% of units have an I or first temporal mode then a check at block 726 is made as to whether the temporal buffer is empty. If the temporal buffer is empty, the units within the tile are inter coded at block 728 and the temporal signals are set to 0 for the units in the tile at block 730. If the temporal buffer is not empty, then the units within the tile are intra coded at block 732. In this case, the temporal signal for the first unit is set to 1 and the temporal signal for all other units in the tile are set to 0 at block 734.

On the right-hand-side of FIG. 13B and starting at the node B, if less than 60% of units have an I or first temporal mode, then the first unit in the current tile is inter coded at block 736 and the temporal signal for the first unit is set to 0 at block 738. Then a check is made at block 740 as to whether a temporal_type for a co-located n+1 unit (i.e. co-located unit in a next frame) is set to 1. If so, a check is made as to whether the residual value is less than 2 at block 742. If the residual value is less than 2 then the residual is removed at block 744, e.g. by setting the residual value to 0. If the residual value is not less than 2, or if the co-located unit is not set to 1, then a determination is made at block 746 as to whether the next unit in the tile is to be intra or inter coded based on a cost function. The temporal signal for the next unit may be set according to the cost function classification at block 748. This may be repeated for the remaining units in the tile. The method, e.g. from the check on temporal_refresh_per_tile, may be repeated for each tile in the frame.

In examples, an encoder (or encoding process) may communicate with one or more remote devices. The encoder may be an encoder as shown in any one of FIGS. 1A, 3A and 3B.

An encoder may communicate across a network. In one case, the encoder may receive configuration data across the network and/or transmit configuration data across the network. The encoder may receive one or more of encoder parameters, temporal signalling and residual masks. The temporal signalling may comprise any of the temporal signalling discussed herein.

In one case, the encoder parameters received across the network may indicate one or more of a residual mode and a temporal mode to be applied by the encoder. The encoder parameters may indicate modes for each stream separately or indicate a common mode for both enhancement streams.

In one case, the encoder may have different configuration settings relating to a remote or cloud configuration. In one mode, which may be a "default" mode, the encoder may be configured to make a remote program call across the network to retrieve initial configuration parameters to perform encoding as described herein. In another mode, which may be a "custom" mode, the encoder may retrieve local parameter values that indicate a particular user configuration, e.g. a particular set of tools that are used by the encoder and/or configurations for those tools. In one case, the encoder may have different modes which indicate which parameters are to be retrieved from a remote device and which parameters are to be retrieved from local storage.

In one case, the temporal signalling may indicate certain processing for a frame of video data, e.g. as described above. The temporal signalling may, for example, indicate a temporal mode for a particular frame as described above (e.g. mode 1 or 0 indicating an intra or inter frame). The temporal signalling may be provided for one or both of the enhancement streams.

The encoder may send and/or receive configuration data to and/or from a remote control server. The control server may comprise a server computing device that implements an application programming interface for receiving or sending data. For example, the control server may implement a RESTful interface, whereby data may be communicated by (secure) HyperText Transfer Protocol (HTTP) requests and responses. In another case, a side channel implemented using a specific communication protocol (e.g. at the transport or application layer) may be used for communications between the control server and the encoder over the network. The network may comprise one or more wired and/or wireless networks, including local and wide area networks. In one case, the network may comprise the Internet.

Using a cloud configuration as described herein may provide implementation advantages. For example, an encoder may be controlled remotely, e.g. based on network control systems and measurements. An encoder may also be upgraded to provide new functionality by upgrading firmware that provides the enhancement processing, with additional data, e.g. based on measurements or pre-processing being supplied by one or more remote data sources or control servers. This provides a flexible way to upgrade and control legacy hardware devices.

Examples described herein consider the temporal characteristics of residuals, e.g. as well as spatial characteristics. For example, in residual images details like "edges" and "dots" that may be observed in residual "images" show little temporal correlation. This is because "edges" in residual images often don't translate or rotate like edges as perceived in a normal video stream. For example, within residual images, "edges" may actually change shape over time, e.g. a head turning may be captured within multiple residual image "edges" but may not move in a standard manner (as the "edge" reflects complex differences that depend on factors such as lighting, scale factors, encoding factors etc.). These temporal aspects of residual images, e.g. residual "video" comprising sequential residual "frames" or "pictures" typically differ from the temporal aspects of conventional images, e.g. normal video frames (e.g. in the Y, U or V planes). Hence, it is not obvious how to apply conventional encoding approaches to residual images; indeed, it has been found that motion compensation approaches from comparative video encoding schemes and standards cannot encode residual data (e.g. in a useful manner).

Furthermore, many comparative video encoding approaches attempt to provide temporal prediction and motion-compensation as default to conventional video data. These "built-in" approaches may not only fail when applied to sequential residual images, they may take up unnecessary processing resources (e.g. these resources may be used while actually corrupting the video encoding). It may also generate unnecessary bits that take up an assigned bit rate. It is not obvious from conventional approaches how to address these problems.

Examples described herein, provide an efficient way of predicting temporal features within residual images. Certain examples use zero-motion vector prediction to efficiently predict temporal aspects and movement within residuals. These may be seen to predict movement for relatively static features (e.g. apply the second temporal mode—inter prediction—to residual features that persist over time) and then use the first temporal mode (e.g. intra prediction) for everything else. Hence, certain examples described herein do not attempt to waste scare resources and bit rate predicting transient uncorrelated temporal features in residual "video".

In the encoding process described herein, encoding the input video into a plurality of encoded streams may be performed block wise. In this way, encoding a first block of elements from a given frame in the input video into the plurality of encoded streams can be performed without using a second block of elements from the same frame in the input video.

Further examples are described below. Further examples relate to a method of encoding an input video into a plurality of encoded streams, such that the encoded streams may be combined to reconstruct the input video, the method comprising: receiving a full resolution input video; downsampling the full resolution input video to create a downsampled video; encoding the downsampled video using a first codec to create a base encoded stream; reconstructing a video from the encoded video to generate a reconstructed video; comparing the reconstructed video to the input video; and, creating one or more further encoded streams based on the comparison.

The input video compared to the reconstructed video may be the downsampled video.

According to an example method, comparing the reconstructed video to the input video comprises: comparing the reconstructed video to the downsampled video to create a first set of residuals and wherein creating the one or more further encoded streams comprises encoding the first set of residuals to create a first level encoded stream.

The input video compared to the reconstructed video may be the full resolution input video and the reconstructed video may be upsampled.

According to an example method, comparing the reconstructed video to the input video comprises: upsampling the reconstructed video to generate an up-sampled reconstructed video; and comparing the up-sampled reconstructed video to the full resolution input video to create a second set of residuals and wherein creating the one or more further encoded streams comprises encoding the second difference to create a second level encoded stream.

Accordingly, in an example, the method may generate a base encoded stream, a first level encoded stream and a second level encoded stream according to the above defined example methods. Each of the first level encoded stream and the second level encoded stream may contain enhancement data used by a decoder to enhance the encoded base stream.

According to an example method, the step of encoding the first set of residuals comprises: applying a transform to the set of residuals to create a set of coefficients; applying a quantization operation to the coefficients to create a set of quantized coefficients; and applying an encoding operation to the quantized coefficients.

The transform may for example be a discrete cosine transform or a wavelet transform. In an alternative example, the transform may be a small transform (e.g.: using a 2×2 kernel or a 4×4 kernel) which decomposes a block of elements into directional components. For example, the 2×2 kernel may be a Hadarmard transform. More details on the transform can be found for example in patent applications PCT/EP2013/059847 or PCT/GB2017/052632, which are incorporated herein by reference. In a further example, the encoder may select between different transforms to be used, for example between the 2×2 kernel and the 4×4 kernel. This enables further flexibility in the way the residuals are encoded.

The selection may be based on an analysis of the data to be transformed.

The quantization may for example be a linear quantization. The linear quantizer may use a dead zone of variable size. The encoding operation may for example be an entropy encoder and may include run-length encoding and/or Huffmann encoding.

According to an example method, the step of encoding the second set of residuals comprises: applying a transform to the second set of residuals to create a set of coefficients; applying a quantization operation to the coefficients to create a set of quantized coefficients; and applying an encoding operation to the quantized coefficients.

The transform may for example be a discrete cosine transform or a wavelet transform. In an alternative example, the transform may be a small transform (e.g.: using a 2×2 kernel or a 4×4 kernel) which decomposes a block of elements into directional components. For example, the 2×2 kernel may be a Hadarmard transform. More details on the transform can be found for example in patent applications PCT/EP2013/059847 or PCT/GB2017/052632, which are incorporated herein by reference. In a further example, the encoder may select between different transforms to be used, for example between the 2×2 kernel and the 4×4 kernel. This enables further flexibility in the way the residuals are encoded.

The selection may be based on an analysis of the data to be transformed.

The first set of residuals and second set of residuals may have different transforms applied to them and the selection may be predetermined or selected during the process. The transform used may be signalled in a header.

The quantization may for example be a linear quantization. The linear quantizer may use a dead zone of variable size. The encoding operation may for example be an entropy encoder and may include run-length encoding and/or Huffmann encoding. Residuals may be a difference between two videos or frames.

The step of encoding the first set of residuals may comprise: ranking the first set of residuals based on a pre-analysis of the first set of residuals; and selecting a subset of residuals to be transformed and encoded.

In an example, the method comprises analysing the first set of residuals and, based on the analysis, either performing the following steps or not: ranking the first set of residuals; and selecting a subset of residuals to be transformed and encoded.

In an example, the method comprises analysing the first set of residuals and ranking the first set of residuals and selecting a subset of residuals to be transformed and encoded, such that the steps of ranking and/or selecting are performed differentially based on the analysis.

According to an example method, the step of applying a transform is performed on the selected subset of residuals.

The step of encoding the second set of residuals may comprise: ranking the second set of residuals based on a pre-analysis of the second set of residuals; and selecting a subset of residuals to be transformed and encoded.

In an example, the method comprises analysing the second set of residuals and, based on the analysis, either performing the following steps or not: ranking the second set of residuals; and/or selecting a subset of residuals to be transformed and encoded.

In an example, the method comprises analysing the second set of residuals and ranking the second set of residuals and selecting a subset of residuals to be transformed and encoded, such that the steps of ranking and/or selecting are performed differentially based on the analysis.

According to an example method, the step of applying a transform is performed on the selected subset of residuals.

The encoded streams may be accompanied by one or more headers which include parameters indicating aspects of the encoding process to facilitate decoding.

For example, the headers may include the codec used, the transform applied, the quantization applied, and/or other decoding parameters.

In certain examples the step of quantization may comprise adapting the quantization based on an analysis of the coefficients and/or data to be transformed, for example, the residuals data. In certain examples the distribution used in the quantization step may be adapted.

The step of encoding the first set of residuals may comprise deriving a set of temporal coefficients from a temporal buffer and subtracting the set of temporal coefficients from the set of coefficients.

The step of encoding the second set of residuals may comprise deriving a set of temporal coefficients from a temporal buffer and subtracting the set of temporal coefficients from the set of coefficients.

It was described above how a step of ranking and selecting may be applied to the residuals data, a step of subtracting temporal coefficients may be performed and also that quantization may be adapted. Each of these steps may be predetermined and selectively applied or may be applied based on analysis of the input video, downsampled video, reconstructed video, upsampled video or any combination of the above to improve the overall performance of the encoder. The steps may be selectively applied based on a predetermined set of rules or determinatively applied based on the analysis or feedback of the performance.

According to an example method the first codec is a hardware-based codec, preferably the first codec is AVC, HEVC, AV1, VP8, or VP9.

According to further examples, there is provided a method of encoding an input video into a plurality of encoded streams, such that the encoded streams may be combined to reconstruct the input video, the method comprising: receiving a full resolution input video; generating a base encoded stream at a resolution that is lower than the full resolution input video; determining a temporal mode for one or more further encoded streams for use in reconstructing the full resolution input video together with the base encoded stream; and generating the one or more further encoded streams by selectively applying a temporal buffer based on the temporal mode.

The method may comprise determining the temporal mode as one of a first temporal mode that does not use the temporal buffer and a second temporal mode that does use the temporal buffer. The temporal buffer may be used to apply temporal prediction.

The method may comprise: obtaining, at the encoder, temporal mode metadata for a plurality of coding units; determining a temporal mode to use for encoding for the plurality of coding units based on the obtained temporal mode metadata; and generating temporal mode signalling data for the plurality of coding units based on the determined temporal mode and the obtained temporal mode metadata.

Temporal prediction may be applied at the encoder by subtracting a set of dequantized transformed coefficients stored within the temporal buffer from a current set of transformed coefficients. The current set of transformed coefficients may be associated with a current frame within the full resolution input video and the set of dequantized transformed coefficients may be associated with a previous frame within the full resolution input video.

In certain examples, determining a temporal mode may comprise estimating a cost function. The cost function may comprise a function of the full resolution input video and one or the one or more further encoded streams. The cost function may be evaluated by encoding the one or more further encoded streams using both temporal modes and comparing one or more metrics determined for each temporal mode. The cost function may be evaluated for one or more portions of a frame, e.g. one or more coding units.

In certain examples, determining a temporal mode may comprise setting a temporal refresh parameter for a frame. The temporal refresh parameter may be used to signal a refresh of the temporal buffer, e.g. a zeroing of one or more values within the buffer. In certain examples, a temporal refresh on a per tile basis may be instructed using temporal signalling at the encoder.

In certain examples, in a second temporal mode that uses the temporal buffer, a temporal refresh parameter may be configured to temporarily effect processing associated with the first temporal mode.

In certain examples, an encoder, e.g. as set out in any of the statements herein, may receive configuration parameters over a network, e.g. from a remote server device. In certain examples, the encoder may additionally, or alternatively, transmit configuration parameters to the remote server device. The configuration parameters may configure the operation of the encoder as described in any one of these statements.

Further examples relate to a method of encoding an input video, the method comprising: receiving an input video at a first resolution; generating one or more residuals based on a difference between the input video and one or more reconstructed videos at one or more respective resolutions; modifying the one or more residuals based on a selected residual mode; and creating one or more encoded streams from the one or more modified residuals.

The method may comprise: downsampling the input video to create a downsampled video at a second resolution; encoding the downsampled video using a first codec to create a base encoded stream; reconstructing a video from the encoded video to generate a reconstructed video; comparing the reconstructed video to the input video; and creating one or more further encoded streams based on the comparison.

One set of residuals may be at the first resolution and one set of residuals may be at a second resolution.

Modifying the one or more residuals may comprise: receiving a set of residual weights; and applying the set of residual weights to a set of residuals to generate the modified residuals.

The method may further comprise thresholding the modified residuals using a set of thresholds. In certain examples, one or more of the set of residual weights and the set of thresholds are determined based on a classification of the input video. In certain examples, the set of residual weights comprise a residual mask that is received from a remote location. In certain examples, one or more of the set of residual weights and the set of thresholds are applied to groups of residuals.

Further examples relate to a method of encoding an input video, the method comprising: receiving an input video at a first resolution; obtaining a desired bit rate for one or more hybrid video streams; generating one or more residuals based on a difference between the input video and one or more reconstructed videos at one or more respective resolutions; determining quantisation parameters for the one or more residuals based on the desired bit rate; quantising the one or more residuals based on the quantisation parameters; and creating one or more encoded streams from the one or more quantized residuals.

The method may comprise: downsampling the input video to create a downsampled video at a second resolution; encoding the downsampled video using a first codec to create a base encoded stream; reconstructing a video from the encoded video to generate a reconstructed video; comparing the reconstructed video to the input video; and creating one or more further encoded streams based on the comparison.

One set of residuals may be at the first resolution and one set of residuals may be at a second resolution.

Determining quantization parameters may comprise: receiving a status of a buffer that receives the one or more encoded streams and the base encoded stream; and using the status to determine the quantisation parameters.

Determining quantization parameters may comprise: receiving a status of a base encoding layer the base encoded stream; and using the status to determine the quantisation parameters.

The quantization parameters may be determined for each frame, residual and/or group of residuals. In one case, the quantization parameters for a frame are determined based on a target data size for the frame and a current data size for the frame using a previous set of quantisation parameters. In one case, the quantization parameters are based on a previous set of quantization parameters.

In one case, the method comprises: capping the determined quantisation parameters based on a current state of the encoder.

In one case, the quantization parameters are used to determine a stepwidth for quantisation. In one case, the quantization parameters comprise a Q value, wherein a stepwidth for quantization is an inverse function of the Q value.

An example method further comprises: sending the base encoded stream. An example method further comprises: sending the first level encoded stream. An example method further comprises: sending the second level encoded stream.

According to a further example there is provided a decoding method. Some examples relate to a method of decoding a plurality of encoded streams into a reconstructed output video, the method comprising: receiving a first base encoded stream; decoding the first base encoded stream according to a first codec to generate a first output video; receiving one or more further encoded streams; decoding the one or more further encoded streams to generate a set of residuals; and combining the set of residuals with the first video to generate a decoded video.

In an example, the method comprises retrieving a plurality of decoding parameters from a header. The decoding parameters may indicate which procedural steps were included in the encoding process.

In an example the step of decoding the one or more further encoded streams to generate a set of residuals comprises: applying an entropy decoding operation; applying a de-quantization operation; and applying an inverse transform operation to generate a set of residuals.

In an example, the step of decoding the one or more further encoded streams to generate a set of residuals comprises: predicting a subset of residuals based on co-located residuals from a temporal buffer.

In an example the method may comprise receiving a first level encoded stream and receiving a second level encoded stream. In this example the step of decoding the one or more further encoded streams to generate a set of residuals comprises: decoding the first level encoded stream to derive a first set of residuals, wherein the step of combining the set of residuals with the first video to generate a decoded video, comprises: combining the first set of residuals with the first output video to generate a second output video; upsampling the second output video to generate an up-sampled second output video; decoding the second level encoded stream to derive a second set of residuals; and combining the second set of residuals with the second output video to generate a reconstructed output video.

In an example, the step of upsampling the second output video to generate an up-sampled second output video comprises: adding a value of an element in the first set of residuals from which a block in the up-sampled second output video was derived to a corresponding block in the up-sampled second output video. The block may be a 2×2 block. This addition step may be selectively performed based on a predetermined value or a signal included in a header.

In an example, the step of decoding the first level encoded stream to derive a first set of residuals, comprises: applying an entropy decoding operation; applying a de-quantization operation; and, applying an inverse transform operation to generate the first set of residuals.

In this example, the step of decoding the first level encoded stream to derive a first set of residuals, comprises: applying a de-blocking filter configured to apply a mask to a block of residuals. The mask may be weighted according to a set of predefined weights.

In an example, the step of decoding the second level encoded stream to derive a second set of residuals, comprises: applying an entropy decoding operation; applying a de-quantization operation; and applying an inverse transform operation to generate the second set of residuals.

The inverse transform operation may be an inverse operation of the operations defined above or may be a substantially mirrored operation. That is, a 2×2 block or 4×4 block transform may be selectively applied. The transform may be detected by the decoding method or signalled in a header.

If a 2×2 transform is used, coefficients may be modified by adding a value of the residual which the transformed block of residuals is predicted from. If a 4×4 transform is used, coefficients will be modified by adding an average value of the four residuals.

According to further examples, there is provided a method of decoding one or more encoded streams into a reconstructed output video, the method comprising: receiving a first base encoded stream; decoding the first base encoded stream according to a first codec to generate a first output video; receiving one or more further encoded streams; receiving data indicating a temporal mode for one or more portions of the one or more further encoded streams; decoding the data indicating a temporal mode and configuring one or more respective temporal buffers for the one or more further encoded streams; decoding the one or more further encoded streams to generate a set of residuals, including selectively applying data from the one or more temporal buffers to the decoded one or more further encoded streams; and combining the set of residuals with the first video to generate a decoded video.

Variations as applied to the method of encoding may be applied in a corresponding manner to the method of decoding.

In one example, the method further comprises: receiving temporal signalling indicating a temporal refresh for a frame; and prior to selectively applying data from one of the one or more temporal buffers in relation to decoded data for the frame, zeroing values within the temporal buffer.

In one example, selectively applying data from the one or more temporal buffers to the decoded one or more further encoded streams comprises subtracting data from one of the one or more temporal buffers responsive to a second temporal mode being indicated and not subtracting data from one of the one or more temporal buffers responsive to a first temporal mode being indicated.

In one example, the data indicating a temporal mode for one or more portions of the one or more further encoded streams comprises a bit per coding unit.

The method may further comprise displaying or outputting the reconstructed output.

Certain examples described herein relate to temporal processing in association with one or more encoded streams. An encoder may be configured to apply temporal processing using a temporal buffer.

The encoder may be configured to encode an input video into a plurality of encoded streams, e.g. such that the encoded streams may be combined to reconstruct the input video. The encoder may be configured to receive an input video comprising respective frames.

In some cases, each frame of the respective frames may be divided into a plurality of tiles. Each tile may be divided into a plurality of blocks.

In other cases, each frame of the respective frames may be divided into a plurality of planes. Each plane may be divided into a plurality of tiles. Each tile of the plurality of tiles may be divided into a plurality of blocks.

The encoder may also be configured to generate a base encoded stream using a base encoder. The encoder may be configured to determine a temporal mode for one or more further encoded enhancement streams for use in reconstructing the input video together with the base stream. The one or more further encoded enhancement streams may be generated using an enhancement encoder. The enhancement encoder may be different from the base encoder. The temporal mode may be one of a first temporal mode that does not apply non-zero values from a temporal buffer for generating the one or more further encoded enhancement streams and a second temporal mode that does apply non-zero values from the temporal buffer for generating the one or more further encoded enhancement streams. Applying non-zero values from the temporal buffer in the second temporal mode may comprise deriving a set of non-zero temporal coefficients from the temporal buffer and using the set of non-zero temporal coefficients to modify a current set of coefficients for generating the one or more further encoded streams.

The encoder may be configured to generate the one or more further encoded enhancement streams based on data derived from the base encoded stream and the input video according to the determined temporal mode. Generating the one or more further encoded enhancement streams may comprise applying a transform to each of a series of blocks of the plurality of blocks. The encoder may be configured to determine the temporal mode for one or more of a frame, tile or block of the input video.

The encoder may be configured to determine the temporal mode based on a cost function. The cost function may incorporate a cost of sending temporal mode signalling data for the temporal mode. The cost of sending temporal mode signalling data for the temporal mode may penalise one value of the temporal mode signalling data as compared to other values of the temporal mode signalling data.

The cost function may comprise a function of the input video and at least one of the one or more further encoded enhancement streams. The encoder may be configured to evaluate the cost function for a frame of the input video. The encoder may be configured to evaluate the cost function for a tile of the input video. The encoder may be configured to evaluate the cost function for a block of the input video.

To evaluate the cost function, the encoder may be configured to encode the one or more further encoded enhancement streams using each of the first temporal mode and the second temporal mode. The evaluate the cost function, the encoder may also be configured to compare one or more metrics determined for each of the first temporal mode and the second temporal mode.

To determine the temporal mode, the encoder may be configured to obtain temporal mode metadata for a set of blocks of the plurality of blocks. The encoder may also be configured to determine the temporal mode to use for encoding the set of blocks based on the temporal mode metadata.

The encoder may be configured to encode, separately from the one or more further encoded streams, temporal mode signalling data indicating the temporal mode for the one or more further encoded streams. The encoder may encode the temporal signalling data using run-length encoding.

The encoder may be configured to determine whether to refresh the temporal buffer for a given frame of the input video based on at least one of: a first proportion of blocks of the given frame for which the first temporal mode is to be used for reconstructing the given frame, and a second proportion of the blocks of the given frame for which the second temporal mode is to be used for reconstructing the given frame.

Refreshing the temporal buffer for the given frame may comprise setting the values within the temporal buffer to zero.

The encoder may be configured to determine the temporal mode for a second frame of the input video, subsequent to a first frame. The encoder may also be configured to omit a quantized value of a transformed block of the first frame from the one or more further encoded enhancement streams based on the temporal mode determined for the second frame.

The encoder may be configured to generate temporal mode signalling data indicating the temporal mode for the one or more further encoded enhancement streams for a decoder. The temporal mode signalling data may be compressed.

Certain examples described herein relate to temporal processing in association with one or more encoded streams. A decoder may be configured to apply temporal processing using a temporal buffer.

The decoder may be configured to receive a plurality of encoded streams. The plurality of encoded streams may have been generated according to the above examples. The decoder may be configured to decode the plurality of encoded streams into a reconstructed output video. The decoder may be configured to receive a first output video, the first output video comprising an output of a base decoder applied to a base level encoded stream. The decoder may be configured to receive one or more further encoded streams. The decoder may be configured to decode respective frames of the one or more further encoded streams to derive respective sets of residuals. In some cases, each frame of the respective frames may be divided into a plurality of tiles. Each tile may be divided into a plurality of blocks.

In other cases, each frame of the respective frames may be divided into a plurality of planes. Each plane may be divided into a plurality of tiles. Each tile of the plurality of tiles may be divided into a plurality of blocks.

The decoder may also be configured to combine the sets of residuals with the first output video to generate the reconstructed output video. To decode the respective frames, the decoder may be configured to obtain, for each block of the plurality of blocks, a preliminary set of residuals from the one or more further encoded streams. To decode the respective frames, the decoder may be configured to derive a set of temporal predictions using a temporal buffer. To decode the respective frames, the decoder may be configured to combine the set of temporal predictions with the preliminary set of residuals to output data for combination with the first output video.

The decoder may be configured to decode the one or more further encoded streams according to a temporal mode. The temporal mode may be one of a first temporal mode that does not apply non-zero values from a temporal buffer for generating the one or more further encoded streams and a second temporal mode that does apply non-zero values from the temporal buffer for generating the one or more further encoded streams. The temporal mode may be determined at an encoder and signalled to the decoder according to the above examples.

The decoder may be configured to receive temporal mode signalling data indicating the temporal mode of each coding unit, i.e. each block. The decoder may be configured to receive temporal mode signalling data indicating the temporal mode of each tile. The temporal mode signalling data received by the decoder may have been encoded separately from the one or more further encoded streams received by the decoder.

According to further examples there may be provided an apparatus for encoding a data set into an encoded data set comprising a header and a payload. The apparatus may be configured to encode an input video according to the above steps. The apparatus may comprise a processor configured to carry out the method of any of the above aspects.

According to further examples there may be provided an apparatus for decoding a data set into a reconstructed video from a data set comprising a header and a payload. The apparatus may be configured to decode an output video according to the above steps. The apparatus may comprise a processor configured to carry out the method of any of the above aspects.

An encoder and decoder may also be provided.

According to further examples there may be provided computer readable media which when executed by a processor cause the processor to perform any of the methods of the above aspects. The above embodiments are to be understood as illustrative examples. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

The invention claimed is:

1. An encoder configured to encode an input video into a plurality of encoded streams, such that the encoded streams may be combined to reconstruct the input video, the encoder configured to:
receive an input video comprising respective frames, each frame of the respective frames being divided into a plurality of tiles and each tile of the plurality of tiles being divided into a plurality of blocks;
generate a base encoded stream using a base encoder;
determine a temporal mode for one or more further encoded enhancement streams for use in reconstructing the input video together with the base encoded stream, the one or more further encoded enhancement streams being generated using an enhancement encoder, wherein the temporal mode is one of a first temporal mode that does not apply non-zero values from a temporal buffer for generating the one or more further encoded enhancement streams and a second temporal mode that does apply non-zero values from the temporal buffer for generating the one or more further encoded enhancement streams; and
generate the one or more further encoded enhancement streams based on data derived from the base encoded stream and the input video according to the determined temporal mode,
wherein generating the one or more further encoded enhancement streams comprises applying a transform to each of a series of blocks of the plurality of blocks, and wherein the temporal mode is determined for one or more of a frame, tile, or block of the input video,
wherein the encoder is configured to encode, separately from the one or more further encoded streams, temporal mode signalling data indicating the temporal mode for the one or more further encoded streams, wherein the encoder is configured to encode the temporal mode signalling data using run-length encoding, wherein the run-length encoding is performed using the same run-length encoding process as a run-length encoding process used by the enhancement encoder to encode the one or more further encoded enhancement streams, wherein the encoder is configured to:
encode temporal mode signalling data indicating the temporal mode of a first block within a tile using the run-length encoding, the temporal mode of the first block being the second temporal mode; and skip the run-length encoding of the temporal mode signalling data of remaining blocks within the tile.

2. The encoder of claim 1, wherein the encoder is configured to determine the temporal mode based on a cost function, wherein the cost function incorporates a cost of sending temporal mode signalling data for the temporal mode.

3. The encoder of claim 2, wherein the cost function comprises a function of the input video and at least one of the one or more further encoded enhancement streams.

4. The encoder of claim 2, wherein the encoder is configured to evaluate the cost function for a frame of the input video, a tile of the input video and a block of the input video.

5. The encoder of claim 2, wherein the cost function is based on a difference between a frame of the input video and corresponding frame of a reconstructed version of the input video.

6. The encoder of claim 2, wherein the encoder is configured to evaluate the cost function by:
encoding the one or more further encoded enhancement streams using each of the first temporal mode and the second temporal mode; and
comparing one or more metrics determined for each of the first temporal mode and the second temporal mode.

7. The encoder of claim 2, wherein the cost function is based on a sum of absolute differences computation.

8. The encoder of claim 1, wherein the encoder is configured to encode a first block of elements from a given frame in the input video into the plurality of encoded streams without using a second block of elements from the given frame in the input video wherein the enhancement encoder is different from the base encoder, wherein the enhancement encoder is configured to receive residual data generated from a comparison of data derived from the input video and data derived from the base encoded stream, wherein the one or more further encoded enhancement streams comprise encoded residual data that is decodable to reconstruct one or more further sets of residual data for application to a decoded version of the base encoded stream.

9. The encoder of claim 1, wherein determining the temporal mode comprises:
obtaining temporal mode metadata for a set of blocks of the plurality of blocks; and
determining the temporal mode to use for encoding the set of blocks based on the temporal mode metadata, wherein the encoder is configured to generate temporal mode signalling data for the set of blocks based on the temporal mode and the temporal mode metadata.

10. The encoder of claim 1, wherein applying non-zero values from the temporal buffer in the second temporal mode comprises deriving a set of non-zero temporal coefficients from the temporal buffer and using the set of non-zero temporal coefficients to modify a current set of coefficients for generating the one or more further encoded enhancement streams.

11. The encoder of claim 1, wherein the encoder is configured to assign a respective value to at least one of: a frame-based temporal parameter for a frame of the input video; a tile-based temporal parameter for a tile of the input video; and a block-based temporal parameter for a block of the input video, wherein the value assigned to the frame-based temporal parameter indicates the temporal mode for the frame of the input video, the value assigned to the tile-based temporal parameter indicates the temporal mode for the tile of the input video, and the value assigned to the block-based temporal parameter indicates the temporal mode for the block of the input video.

12. The encoder of claim 11, wherein at least one of:
a bit-length of the value of the frame-based temporal parameter is one bit;
a bit-length of the value of the tile-based temporal parameter is one bit; and
a bit-length of the value of the block-based temporal parameter is one bit.

13. The encoder of claim 11, wherein the encoder is configured to assign the value of the block-based temporal parameter for the block of the input video to further indicate the temporal mode for the tile comprising the block.

14. The encoder of claim 1, wherein the encoder is configured to determine whether to refresh the temporal buffer for a given frame of the input video based on at least one of: a first proportion of blocks of the given frame for which the first temporal mode is to be used for reconstructing the given frame, and a second proportion of the blocks of the given frame for which the second temporal mode is to be used for reconstructing the given frame, wherein the refreshing of the temporal buffer for the given frame comprises setting values within the temporal buffer to zero.

15. The encoder of claim 1, wherein the encoder is configured to:
determine the temporal mode for a second frame of the input video, subsequent to a first frame; and
omit a quantized value of a transformed block of the first frame from the one or more further encoded enhancement streams based on the temporal mode determined for the second frame, wherein the encoder is configured to use the temporal mode determined for the second frame to control a comparison between the quantized value and one or more thresholds to determine whether the quantized value is to be omitted.

16. The encoder of claim 1, wherein the encoder is configured to generate temporal mode signalling data indicating the temporal mode for the one or more further encoded enhancement streams for a decoder, optionally wherein the temporal mode signalling data is compressed.

17. A method of encoding an input video into a plurality of encoded streams, such that the encoded streams may be combined to reconstruct the input video, the method comprising:
receiving an input video comprising respective frames, each frame of the respective frames being divided into a plurality of tiles and each tile of the plurality of tiles being divided into a plurality of blocks;
generating a base encoded stream using a base encoder;
determining a temporal mode for one or more further encoded enhancement streams for use in reconstructing the input video together with the base encoded stream, the one or more further encoded enhancement streams being generated using an enhancement encoder, wherein the temporal mode is one of a first temporal mode that does not apply non-zero values from a temporal buffer for generating the one or more further encoded enhancement streams and a second temporal mode that does apply non-zero values from the temporal buffer for generating the one or more further encoded enhancement streams; and
generating the one or more further encoded enhancement streams based on data derived from the base encoded stream and the input video according to the determined temporal mode,
wherein generating the one or more further encoded enhancement streams comprises applying a transform to each of a series of blocks of the plurality of blocks, and wherein the temporal mode is determined for one or more of a frame, tile, or block of the input video, encoding, separately from the one or more further encoded streams, temporal mode signalling data indicating the temporal mode for the one or more further encoded streams, encoding the temporal mode signalling data using run-length encoding, wherein the run-length encoding is performed using the same run-length encoding process as a run-length encoding process used by the enhancement encoder to encode the one or more further encoded enhancement streams, encoding the temporal mode signalling data indicating the temporal mode of a first block within a tile using the run-length encoding, the temporal mode of the first block being the second temporal mode, and skip the run-length encoding of the temporal mode signalling data of remaining blocks within the tile.

18. A non-transitory computer-readable medium having stored therein computer executable instructions that when executed by a processor of a computing system cause the computing system to encode an input video into a plurality of encoded streams, such that the encoded streams may be combined to reconstruct the input video, the computing system caused to:

receive an input video comprising respective frames, each frame of the respective frames being divided into a plurality of tiles and each tile of the plurality of tiles being divided into a plurality of blocks;

generate a base encoded stream using a base encoder;

determine a temporal mode for one or more further encoded enhancement streams for use in reconstructing the input video together with the base encoded stream, the one or more further encoded enhancement streams being generated using an enhancement encoder, wherein the temporal mode is one of a first temporal mode that does not apply non-zero values from a temporal buffer for generating the one or more further encoded enhancement streams and a second temporal mode that does apply non-zero values from the temporal buffer for generating the one or more further encoded enhancement streams; and generate the one or more further encoded enhancement streams based on data derived from the base encoded stream and the input video according to the determined temporal mode, wherein generating the one or more further encoded enhancement streams comprises applying a transform to each of a series of blocks of the plurality of blocks, and wherein the temporal mode is determined for one or more of a frame, tile, or block of the input video, encode, separately from the one or more further encoded streams, temporal mode signalling data indicating the temporal mode for the one or more further encoded streams, encode the temporal mode signalling data using run-length encoding, wherein the run-length encoding is performed using the same run-length encoding process as a run-length encoding process used by the enhancement encoder to encode the one or more further encoded enhancement streams, encode the temporal mode signalling data indicating the temporal mode of a first block within a tile using the run-length encoding, the temporal mode of the first block being the second temporal mode, and skip the run-length encoding of the temporal mode signalling data of remaining blocks within the tile.

* * * * *